(12) United States Patent
Wang et al.

(10) Patent No.: US 11,014,527 B2
(45) Date of Patent: *May 25, 2021

(54) WEBBING HEIGHT ADJUSTMENT DEVICE

(71) Applicant: Liang Hsiung Wang, Tainan (TW)

(72) Inventors: Liang Hsiung Wang, Tainan (TW); Chia-Chun Chu, Tainan (TW)

(73) Assignee: Liang Hsiung Wang, Tainan (TW)

( * ) Notice: Subject to any disclaimer, the term of this patent is extended or adjusted under 35 U.S.C. 154(b) by 125 days.

This patent is subject to a terminal disclaimer.

(21) Appl. No.: 16/454,209

(22) Filed: Jun. 27, 2019

(65) Prior Publication Data
US 2020/0017064 A1 Jan. 16, 2020

(30) Foreign Application Priority Data

Jul. 12, 2018 (TW) .................. 107124059

(51) Int. Cl.
*B60R 22/20* (2006.01)
*B60R 22/02* (2006.01)

(52) U.S. Cl.
CPC .......... *B60R 22/201* (2013.01); *B60R 22/024* (2013.01)

(58) Field of Classification Search
CPC ....... B60R 22/20; B60R 22/024; B60R 22/24; B60R 2022/1818
USPC .................................. 280/801.1–2
See application file for complete search history.

(56) References Cited

U.S. PATENT DOCUMENTS

| 4,834,427 | A | * | 5/1989 | Takada | B60R 22/203 280/801.2 |
| 5,655,793 | A | * | 8/1997 | Isonaga | B60R 22/203 280/801.2 |
| 6,336,662 | B1 | * | 1/2002 | Kurita | B60N 2/3011 280/801.1 |
| 9,738,248 | B2 | * | 8/2017 | Dingman | B60R 22/24 |
| 10,011,245 | B2 | * | 7/2018 | Wang | B60R 22/20 |
| 10,173,635 | B2 | * | 1/2019 | Wang | B60R 22/20 |
| 10,493,949 | B2 | * | 12/2019 | Jaradi | B60R 22/202 |
| 10,654,442 | B2 | * | 5/2020 | Wang | B60R 22/105 |

(Continued)

FOREIGN PATENT DOCUMENTS

| EP | 2045147 A1 | 4/2009 |
| EP | 3335941 A1 | 6/2018 |
| EP | 3486126 A1 | 5/2019 |

*Primary Examiner* — Paul N Dickson
*Assistant Examiner* — Caitlin Anne Miller
(74) *Attorney, Agent, or Firm* — Alan D. Kamrath; Karin L. Williams; Mayer & Williams PC

(57) ABSTRACT

A webbing height adjustment device is applied to connect to a webbing of a seat belt system. The webbing height adjustment device has a top ring member, a locking assembly, and a positioning member. The locking assembly is moveably disposed outside the top ring member. The positioning member is disposed on the side surface of the top ring member, is clutched with the locking assembly, and has a positioning element and a combining portion. The positioning element is disposed on the top ring member. The combining portion is disposed on the positioning element and selectively holds the locking assembly for positioning. The webbing height adjustment device is easy to operate and automatically locks the webbing. The webbing height adjustment device can be adjusted continuously and occupies little space when not in use.

36 Claims, 32 Drawing Sheets

(56) References Cited

U.S. PATENT DOCUMENTS

| | | | |
|---|---|---|---|
| 2005/0012321 A1* | 1/2005 | Moendel | B60R 22/18 |
| | | | 280/808 |
| 2009/0091115 A1* | 4/2009 | Bell | B60R 22/20 |
| | | | 280/801.2 |
| 2020/0017065 A1* | 1/2020 | Wang | B60R 22/201 |

* cited by examiner

WEBBING HEIGHT ADJUSTMENT DEVICE

This application claims the benefit of Taiwan patent application No. 107124059, filed on Jul. 12, 2018, the partial contents of which are incorporated herein by reference.

BACKGROUND OF THE INVENTION

1. Field of the Invention

The present invention relates to a webbing height adjustment device, and more particularly to a webbing height adjustment device to adjust a height of an upper area of a three-point seat belt system of a vehicle.

2. Description of Related Art

A seat belt system is applied to a motor vehicle for protecting every occupant in the vehicle. In general, a retractor of the seat belt system is disposed on a support pillar in the vehicle. A webbing of the seat belt system is pulled out from the retractor of the seat belt system. The webbing of the seat belt system is passed through a top ring of the seat belt system, and then the webbing is obliquely passed the front of the occupant's torso. A tongue mounted around the webbing is inserted into a buckle mounted on a seat of the vehicle. A section of the webbing passes through the tongue and extends to a side of the seat near the retractor to form a three-point seat belt system. The body of the occupant in the vehicle is restrained on the seat in the vehicle by the webbing of the seat belt system.

In a conventional three-point seat belt system, when the webbing is fastened tightly, the height of the webbing near the shoulder of the occupant cannot be adjusted. In emergency, the neck of the occupant may be slashed by the webbing. A webbing height adjustment device is adopted to overcome the shortcoming that the height of the webbing cannot be adjusted. Therefore, with increasing awareness on vehicle safety, the height adjustment device for the webbing of the seat belt system is necessary.

A conventional webbing height adjustment device of the seat belt system is adapted to a specific vehicle and has some defects, such as complex structure, short range of adjustment, non-continuous adjustment, and complicated operation. Thus, it is necessary to invent a simplified, convenient, and useful webbing height adjustment device. According to the occupants with different builds, the height of the webbing can be adjusted by a new webbing height adjustment device for the webbing to stay close to the shoulder of the occupant in the vehicle and increasing the safety.

To overcome the shortcomings, the present invention provides a webbing height adjustment device to mitigate or obviate the aforementioned problems.

SUMMARY OF THE INVENTION

The objective of the invention is to provide a webbing height adjustment device that can solve the problems of the conventional webbing height adjustment device including complex structure, short range of adjustment, non-continuous adjustment, and complicated operation.

The webbing height adjustment device is applied to connect to a webbing of a seat belt system. The webbing height adjustment device has a top ring member, a locking assembly, and a positioning member.

The top ring member has a side surface, a retaining element, a top ring, and a retaining hole. The retaining element has a bottom end. The top ring is connected to the bottom end of the retaining element. The webbing is passed through the top ring. The retaining hole is formed through the retaining element.

The locking assembly is moveably disposed outside the side surface of the top ring member and has a frame and a slider.

The frame is disposed outside the side surface of the top ring member and has a body and a connecting portion. The body is disposed outside the side surface of the top ring member and has a bottom end, a through hole formed through the body, two sides, and two longitudinal side portions disposed at the two sides of the body, respectively. The connecting portion is formed on the bottom end of the body and has a connecting hole formed on the connecting portion. The connecting portion is connected to a section of the webbing.

The slider is moveably disposed in the body of the frame and has two sides, a first plate portion, a second plate portion, and a through portion. The first plate portion and the second plate portion are respectively disposed at the two sides of the slider and are opposite to each other. The through portion is formed between the first plate portion and the second plate portion and has a through slot formed through the through portion. Another section of the webbing is inserted through the through slot. The section of the webbing inserted through the through slot is locked or unlocked by a relative motion between the frame and the slider.

The positioning member is disposed on the top ring member, is clutched with the locking assembly, and has a positioning element and a combining portion. The positioning element is disposed on the top ring member. The combining portion is disposed on the positioning element and selectively holds the locking assembly for positioning.

As mentioned above, the frame has a positioning portion. The positioning portion is formed on the top end of the body and has a combining hole formed through the positioning portion. The positioning element is disposed on a side surface of the retaining element of the top ring member, and has a central hole formed through the positioning element. A threaded element is inserted through the positioning element and the retaining element for positioning the positioning element and the retaining element. The combining portion is selectively inserted through the combining hole of the positioning portion in the frame for positioning the positioning portion, and has a protruding rod and an end block. The protruding rod is disposed on a side surface of the positioning element, and has a front end and a rear end. The rear end of the protruding rod is opposite to the front end of the protruding rod and is connected to the side surface of the positioning element. The end block is disposed on the front end of the protruding rod. An outer diameter of the end block is larger than an outer diameter of the protruding rod. The end block can be inserted through the combining hole of the positioning portion.

As mentioned above, the frame has a positioning portion. The positioning portion is formed on a top end of the body and has a combining hole formed through the positioning portion. The positioning element is disposed on a side surface of the retaining element of the top ring member, and has a central hole and two abutting rods. The central hole is formed through the positioning element. A threaded element is inserted through the positioning element and the retaining element for positioning the positioning element and the retaining element. The two abutting rods are disposed on a rear surface of the positioning element and abut against the retaining element for positioning on the retaining element. The combining hole is an elongated hole. The combining portion is an elongated rib and is selectively inserted into the combining hole.

As mentioned above, the frame has a positioning portion. The positioning portion is formed on a top end of the body and has a combining hole formed through the positioning portion. The positioning element is disposed outside and is retained on the retaining element of the top ring member. The combining portion is selectively inserted through the combining hole of the positioning portion in the frame for positioning the positioning portion, and has a protruding rod and an end block. The protruding rod is disposed on a side surface of the positioning element and has a front end and a rear end. The rear end of the protruding rod is opposite to the front end of the protruding rod and is connected to the side surface of the positioning element. The end block is disposed on the front end of the protruding rod. An outer diameter of the end block is larger than an outer diameter of the protruding rod. The end block can be inserted through the combining hole of the positioning portion.

As mentioned above, the connecting portion of the frame is connected to a connecting strap. The connecting strap is connected to a connecting element. The webbing passes through the connecting element.

As mentioned above, the first plate portion of the slider and the second plate portion of the slider vertically deviate from each other. The first plate portion has a top surface, a bottom section, and a bottom end. The second plate portion has a top surface, a top section, and a top end. The top surface of the first plate portion is higher than the top surface of the second plate portion.

The through portion of the slider is formed between the bottom section of the first plate portion and the top section of the second plate portion, and has two side walls and two slide slots. The two side walls are disposed at two sides of the through slot, respectively. Each one of the two side walls is connected to the first plate portion and the second plate portion and has an outer surface. The two slide slots are respectively formed on the outer surfaces of the two side walls. Each one of the two slide slots is located between the first plate portion and the second plate portion. Two longitudinal side portions of the body are respectively inserted into the two slide slots.

The through slot is sloped from the top end of the second plate portion toward the bottom end of the first plate portion and is located between the two side walls.

As mentioned above, the locking assembly has a cover and a positioning portion. The cover is moveably disposed around and outside the frame for driving the slider to move relative to the frame, and has a covering base and two covering side plates. The covering base has two side surfaces and a back surface. The two covering side plates are respectively formed on the two side surfaces of the covering base and are opposite to each other. The positioning portion is disposed on and backwardly protrudes out of the back surface of the covering base, and has a bottom end and a recess formed on the bottom end of the positioning portion.

The positioning element is disposed on a side surface of the retaining element of the top ring member, and has a central hole formed through the positioning element. A threaded element is inserted through the positioning element and the retaining element for positioning the positioning element and the retaining element.

The combining portion is disposed on a bottom section of the positioning element. The cover is selectively positioned on the combining portion by the positioning portion.

As mentioned above, the end block can be inserted into the recess of the positioning portion.

As mentioned above, the positioning element is disposed outside and is retained on the retaining element of the top ring member. The combining portion is disposed on a bottom section of the positioning element. The cover is selectively positioned on the combining portion by the positioning portion.

As mentioned above, the cover has a top stop portion formed on the back surface of the covering base. Each one of the two covering side plates has a top surface, a bottom surface, an inner surface, a guiding groove, and a bottom wall. The guiding groove is formed on the inner surface of the covering side plate, extends to the top surface of the covering side plate, and has a bottom. The bottom wall is formed on the bottom surface of the covering side plate and is located at the bottom of the guiding groove.

Two sides of the body of the frame are moveably inserted into the guiding grooves of the two covering side plates, and the top stop portion is located above the top surfaces of the two covering side plates.

The webbing height adjustment device is applied to the seat belt system in the vehicle. The top ring member of the webbing height adjustment device is fixed in the vehicle above and behind a seat. The webbing of the seat belt system is passed through the top ring of the top ring member. The locking assembly is connected to two sections of the webbing for locking or unlocking the webbing. A height position of a top positioning point on the webbing can be adjusted continuously by the webbing height adjustment device. The webbing height adjustment device is easy to operate and automatically locks the webbing.

When the webbing height adjustment device is not in use, the locking assembly can move automatically and upwardly by the retracted webbing and engages with the positioning member disposed on a side surface of the top ring member. The webbing height adjustment device can be retracted above a side of the seat to save space. The webbing can be pulled freely under an unlocked status.

When the height position of the top positioning point on the webbing needs adjusting, the locking assembly is detached from the positioning member disposed on the side surface of the top ring member. The height position of the positioning point on the webbing can be adjusted upwardly or downwardly in an intuitive way by the locking assembly. The relative motion between the frame and the slider is generated to unlock the webbing. The height position of the positioning point is adjusted continuously. When the webbing height adjustment device may be moved to a suitable position, the locking assembly can be released. The frame and the slider of the locking assembly lock the webbing automatically by the tension of the webbing for ensuring that the positioning point of the webbing is close to the height of the shoulder of the occupant. The webbing height adjustment device is adapted to three-point seat belt systems in various types of vehicles. The webbing adjustment device is simplified in structure, easy in operation, and cost-effective in manufacture and assembly. The webbing height adjustment device can be adjusted continuously. The adjustment range of the webbing height adjustment device is long. The webbing height adjustment device is easy to operate and automatically locks the webbing. The webbing height adjustment device occupies very little space when not in use.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 32, a webbing height adjustment device in accordance with the present invention has multiple embodiments shown and described as follows.

Figure 1:
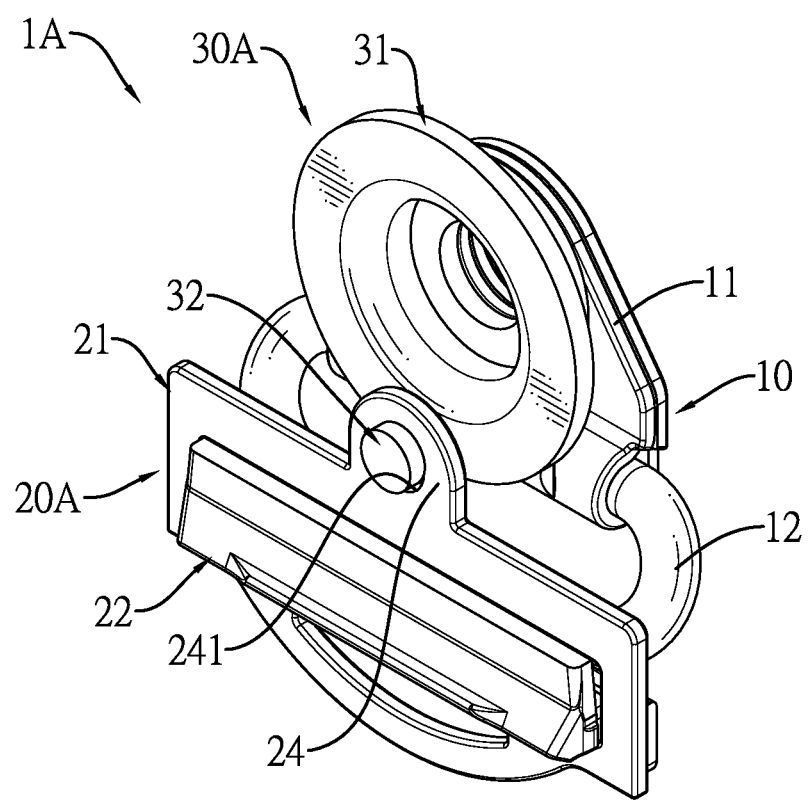
FIG. 1 is a perspective view of a first embodiment of a webbing height adjustment device in accordance with the present invention.
Figure 2:
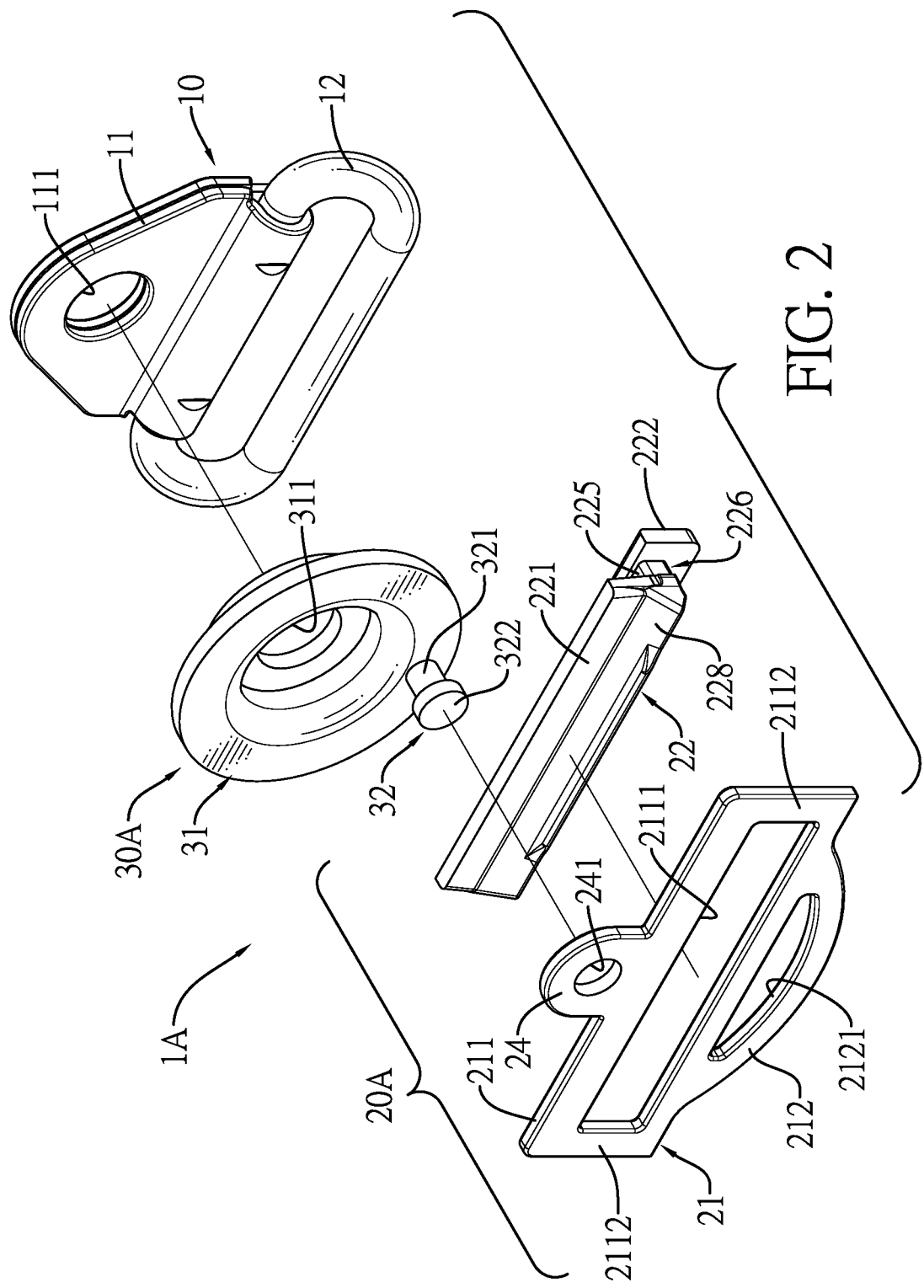
FIG. 2 is an exploded perspective view of the webbing height adjustment device in FIG. 1.
Figure 3:
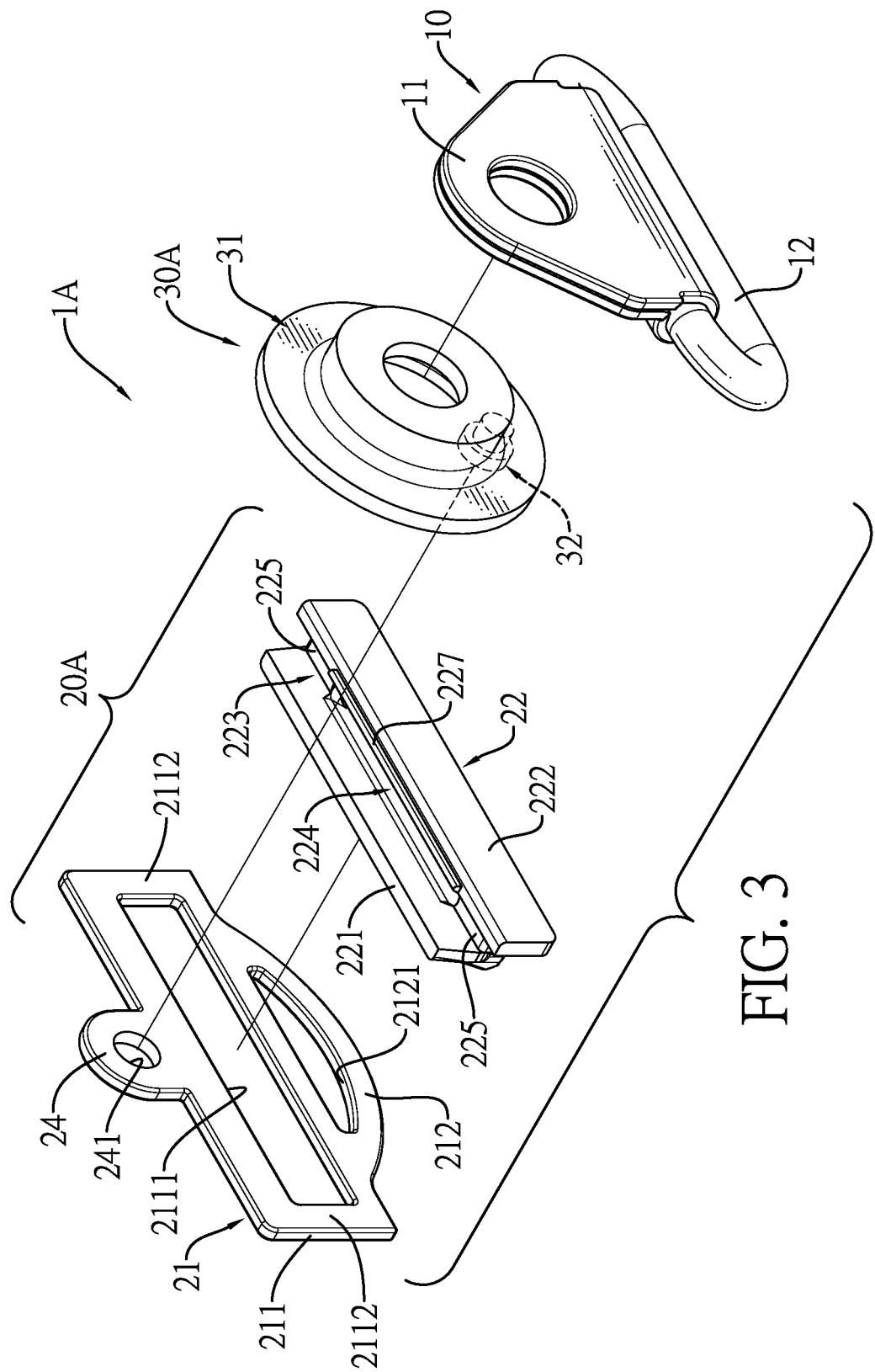
FIG. 3 is another exploded perspective view of the webbing height adjustment device in FIG. 1.

With reference to FIGS. 1 to 3, a first embodiment of a webbing adjustment device 1A in accordance with the present invention comprises a top ring member 10, a locking assembly 20A, and a positioning member 30A.

With reference to FIGS. 1 to 4, the top ring member 10 is fixed beside and above a seat in the vehicle or is fixed above and behind the seat. The top ring member 10 has a side surface, a retaining element 11, a top ring 12, and a retaining hole 111. The retaining element 11 has a bottom end. The top ring 12 is connected to the bottom end of the retaining element 11. The webbing 2 is disposed beside the seat or is fixed above and behind the seat, and is passed through the top ring 12. The retaining hole 111 is formed through the retaining element 11.

With reference to FIGS. 1 to 4, the locking assembly 20A is moveably disposed outside and in front of the side surface of the top ring member 10, and is connected to two sections of the webbing 2 beside two sides of the top ring 12. The locking assembly 20A has a frame 21 and a slider 22. The frame 21 is disposed outside the side surface of the top ring member 10. The slider 22 is moveably disposed in the frame 21. The webbing 2 is locked or unlocked by a relative motion between the frame 21 and the slider 22.

With reference to FIGS. 1 to 3, in the locking assembly 20A, the frame 21 has a body 211 and a connecting portion 212. The body 211 is disposed outside the side surface of the top ring member 10 and has a bottom end, a through hole 2111, two sides, and two longitudinal side portions 2112. The through hole 2111 is formed through the body 211. The longitudinal side portions 2112 are disposed at the two sides of the body 211. The connecting portion 212 is formed on the bottom end of the body 211 and has a connecting hole 2121 formed on the connecting portion 212. The connecting portion 212 is connected to a section of the webbing 2. The connecting hole 2121 may be a blind hole or an open hole such as in the form of a slit. The frame 21 has a positioning portion 24. The positioning portion 24 is formed on a top end of the body 211 and has a combining hole 241 formed through the positioning portion 24.

With reference to FIGS. 1 to 4, the slider 22 is moveably disposed in the body 211 of the frame 21. The slider 22 can move relative to the frame 21 along a moving direction of the webbing 2. The slider 22 has two sides, a first plate portion 221, a second plate portion 222, and a through portion 223. The first plate portion 221 is disposed at one of the two sides of the slider 22. The second plate portion 222 is disposed at the other one of the two sides of the slider 22 and is opposite to the first plate portion 221. The through portion 223 is formed between the first plate portion 221 and the second plate portion 222, and has a through slot 224, two side walls 225, and two slide slots 226. The through slot 224 is formed through the through portion 223. The two side walls 225 are disposed at two sides of the through slot 224, respectively. Each one of the two side walls 225 is connected to the first plate portion 221 and the second plate portion 222 and has an outer surface. The two slide slots 226 are respectively formed on the outer surfaces of the two side walls 225. Each one of the two slide slots 226 is located between the first plate portion 221 and the second plate portion 222. The through portion 223 of the slider 22 is inserted through the through hole 2111 of the body 211. The first plate portion 221 and the second plate portion 222 of the slider 22 are respectively located at two sides of the frame 21. The two longitudinal side portions 2112 of the body 211 are respectively inserted into the two slide slots 226 of the through portion 223 in the slider 22. The through portion 223 of the slider 22 is limited by the through hole 2111 of the body 211. The slider 22 moves in a limited range defined in the body 211 of the frame 21.

With reference to FIGS. 1 to 4, the webbing 2 is directly inserted through the connecting hole 2121 of the connecting portion 212 in the frame 21. With reference to FIG. 5, the connecting portion 212 can be connected to a connecting strap 25. The connecting strap 25 is connected to a connecting element 26. The webbing 2 is inserted through the connecting element 26. The connecting portion 212 of the frame 21 is indirectly connected to the webbing 2 by the connecting strap 25 and the connecting element 26 in series connection. The connecting strap 25 is a strap having elasticity or no elasticity.

With reference to FIGS. 1 to 3, in the slider 22, the first plate portion 221 of the slider 22 and the second plate portion 222 of the slider 22 vertically deviate from each other. The first plate portion 221 has a top surface, a bottom section, and a bottom end. The second plate portion 222 has a top surface, a top section, and a top end. The top surface of the first plate portion 221 in front of the second plate portion 222 is higher than the top surface of the second plate portion 222. Each one of the two side walls 225 is connected to a back side of the bottom section of the first plate portion 221 and a front side of the top section of the second plate portion 222. The through slot 224 is sloped from the top end of the second plate portion 222 toward the bottom end of the first plate portion 221 and is located between the two side walls 225. The second plate portion 222 has a top flange 227 formed on the top surface of the second plate portion 222. The first plate portion 221 has a wedge protrusion 228. The wedge protrusion 228 is formed on and protrudes out of a side surface of the bottom section of the first plate portion 221.

With reference to FIGS. 1 to 3, the positioning member 30A is disposed on a side surface of the retaining element 11 of the top ring member 10, is fixed beside and above the seat in the vehicle, and is selectively clutched with the locking assembly 20A. The positioning member 30A has a positioning element 31 and a combining portion 32. The positioning element 31 is disposed on the top ring member 10 and has a central hole 311 formed through the positioning element 31. A threaded element 6 is inserted through the positioning element 31 and the retaining element 11 of the top ring member 10 for positioning the positioning element 31 and the retaining element 11.

The combining portion 32 is disposed on a side surface of a bottom section of the positioning element 31, and is selectively inserted through the combining hole 24 of the positioning portion 24 in the frame 21 for holding the locking assembly 20A. The locking assembly 20A can engage with the positioning member 30A fixed on the top ring member 10. The locking assembly 20A can be oscillated relative to the positioning member 30A. Furthermore, the combining portion 32 has a protruding rod 321 and an end block 322. The protruding rod 321 is disposed on a side surface of the positioning element 31 and has a front end and a rear end. The rear end of the protruding rod 321 is opposite to the front end of the protruding rod 321 and is connected to the side surface of the positioning element 31. The end block 322 is disposed on the front end of the protruding rod 321. An outer diameter of the end block 322 is larger than an outer diameter of the protruding rod 321. The end block 322 can be inserted through the combining hole 241 of the positioning portion 24.

Figure 4:
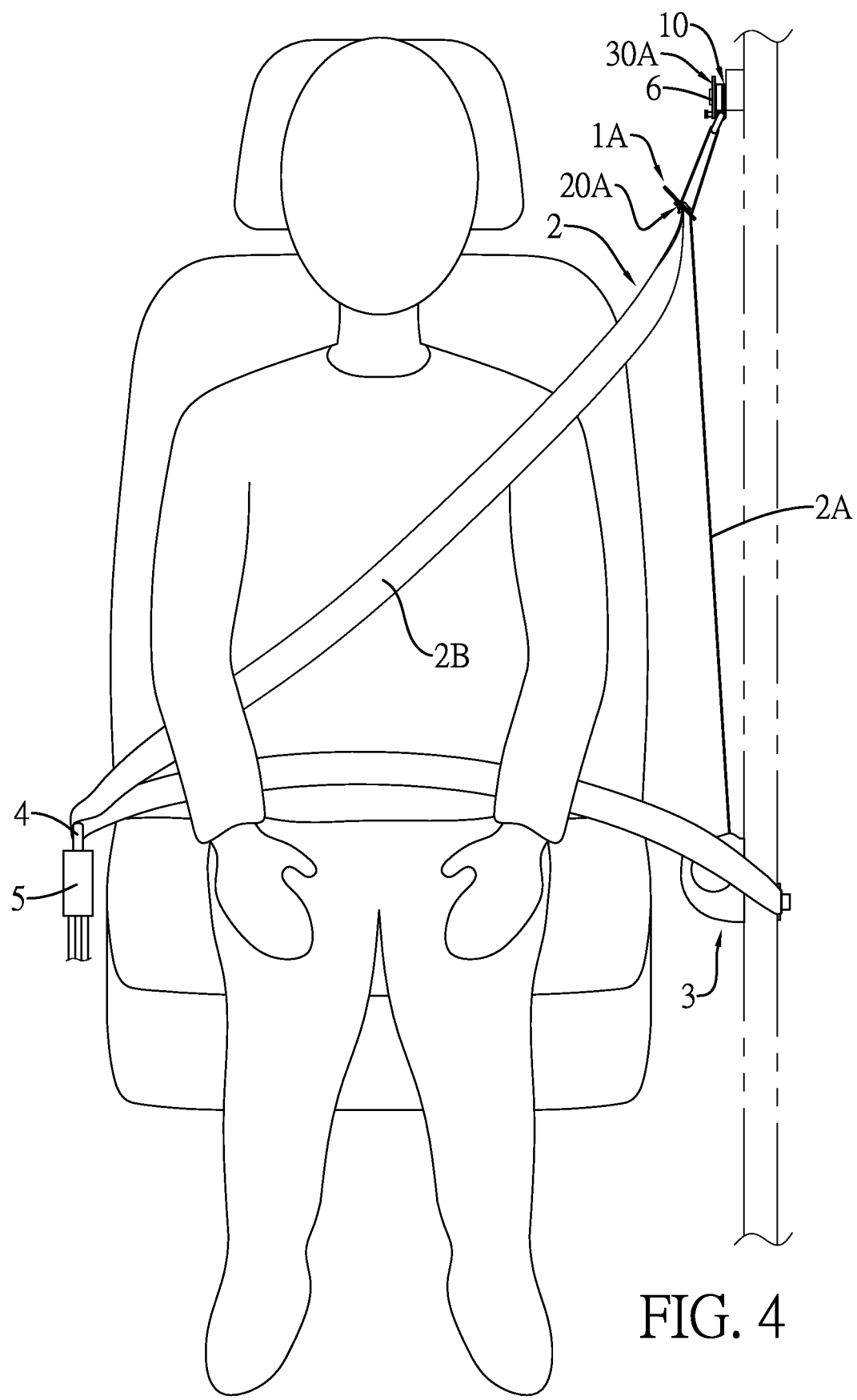
FIG. 4 is an operational front side view of the webbing height adjustment device in FIG. 1, showing the webbing height adjustment device is assembled on a seat belt system.
Figure 5:
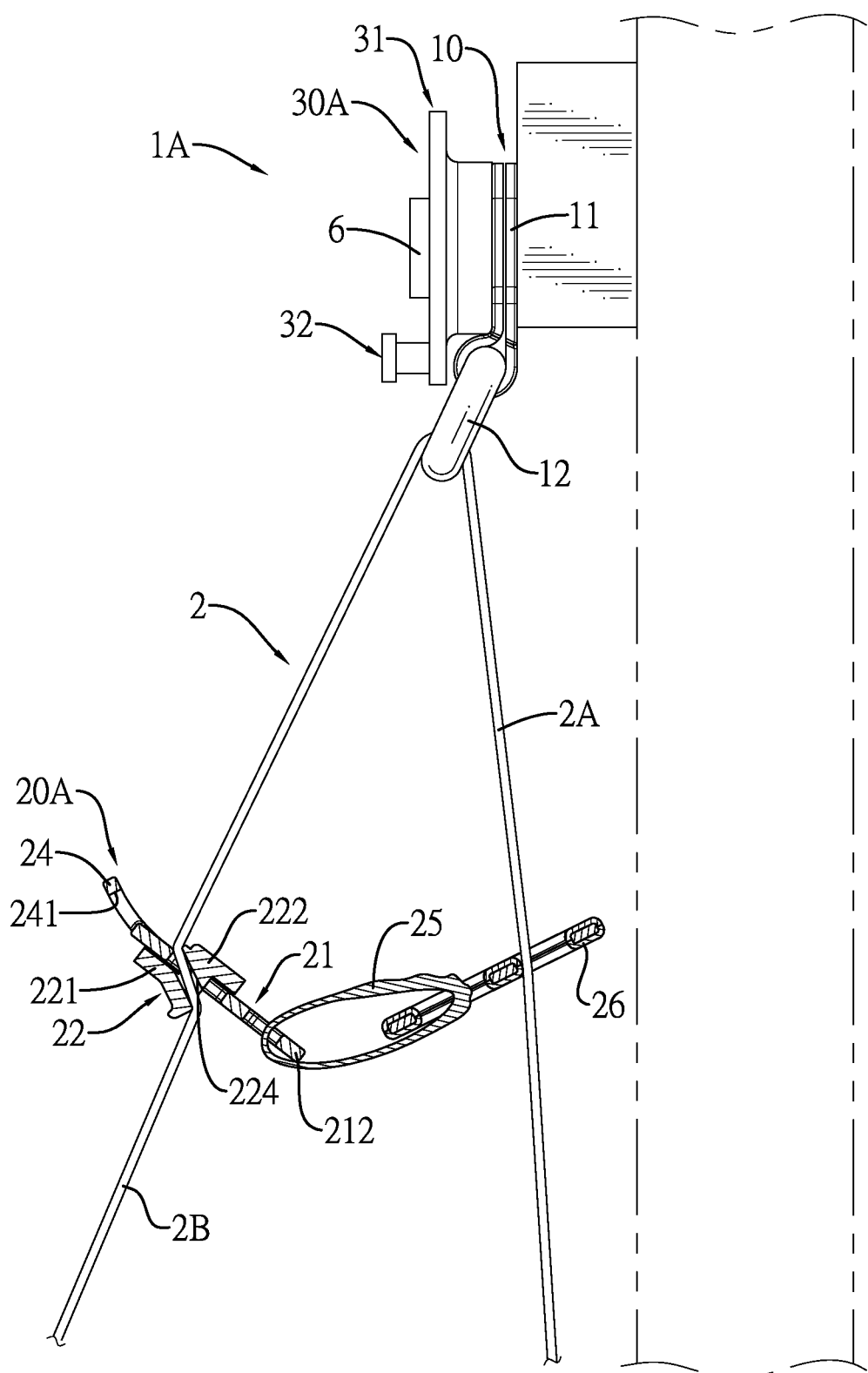
FIG. 5 is an enlarged and operational front side view in partial section of the webbing height adjustment device in FIG. 4, showing a frame is connected to a connecting element by a connecting strap, and a webbing is passed through the connecting element.

In use, with reference to FIG. 4, the first embodiment of the webbing height adjustment device 1A is applied to a seat belt system in the vehicle. The retaining element 11 of the top ring member 10 and the positioning member 30A are oscillatably and fixedly disposed beside and above the seat in the vehicle by a threaded element 6. The webbing 2 is pulled from a retractor 3 located beside the seat and is passed through the connecting portion 212 of the frame 21. With reference to FIG. 5, the connecting portion 212 can be connected to the connecting strap 25. The connecting strap 25 is connected to the connecting element 26. The webbing 2 is inserted through the connecting element 26. Then, with reference to FIGS. 4 and 5, the webbing 2 is passed through the top ring 12 of the top ring member 10 and the through slot 224 of the slider 22 located in the frame 21. The webbing 2 has a front section 2A and a rear section 2B. The front section 2A of the webbing 2 is defined between the top ring 12 and the retractor 3. The rear section 2B of the webbing 2 is connected to the front section 2A of the webbing 2 and is sequentially passed through the top ring 12, the frame 21, the slider 22, the tongue 4, and the retractor 3.

Figure 6:
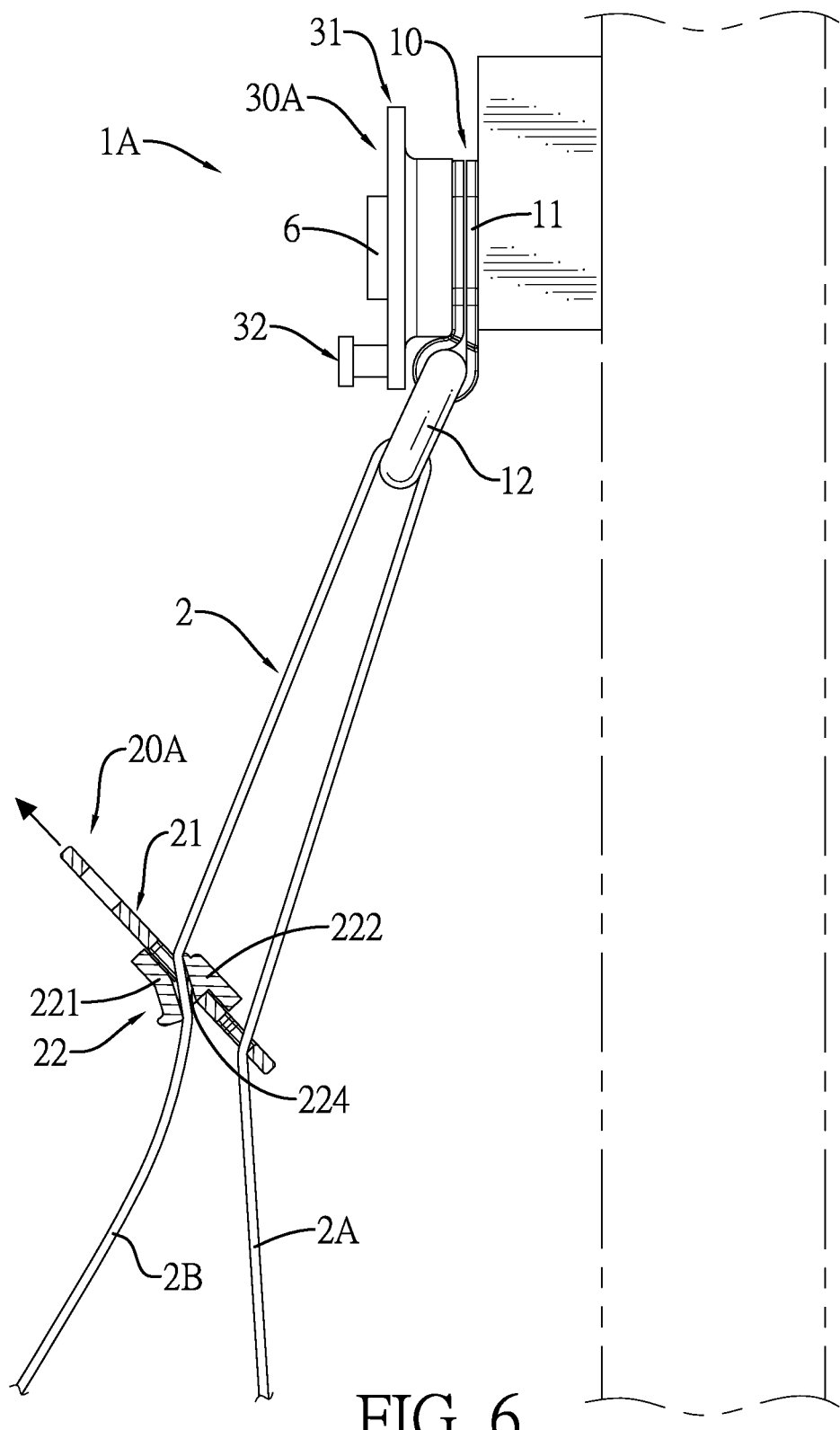
FIG. 6 is an operational front side view in partial section of the webbing height adjustment device in FIG. 4, showing a webbing is set in an unlocked state.

With reference to FIGS. 4 and 6, an occupant sits on the seat and the webbing 2 is fastened to abut the torso of the occupant. The tongue 4 connected to the rear section 2B is inserted into a buckle 5 located beside the seat. The rear section 2B of the webbing 2 is locked or unlocked by the relative motion between the frame 21 and the slider 22. The webbing height adjustment device 1A forms a positioning sliding point between the front section 2A and the rear section 2B near the top ring member 10.

Figure 7:
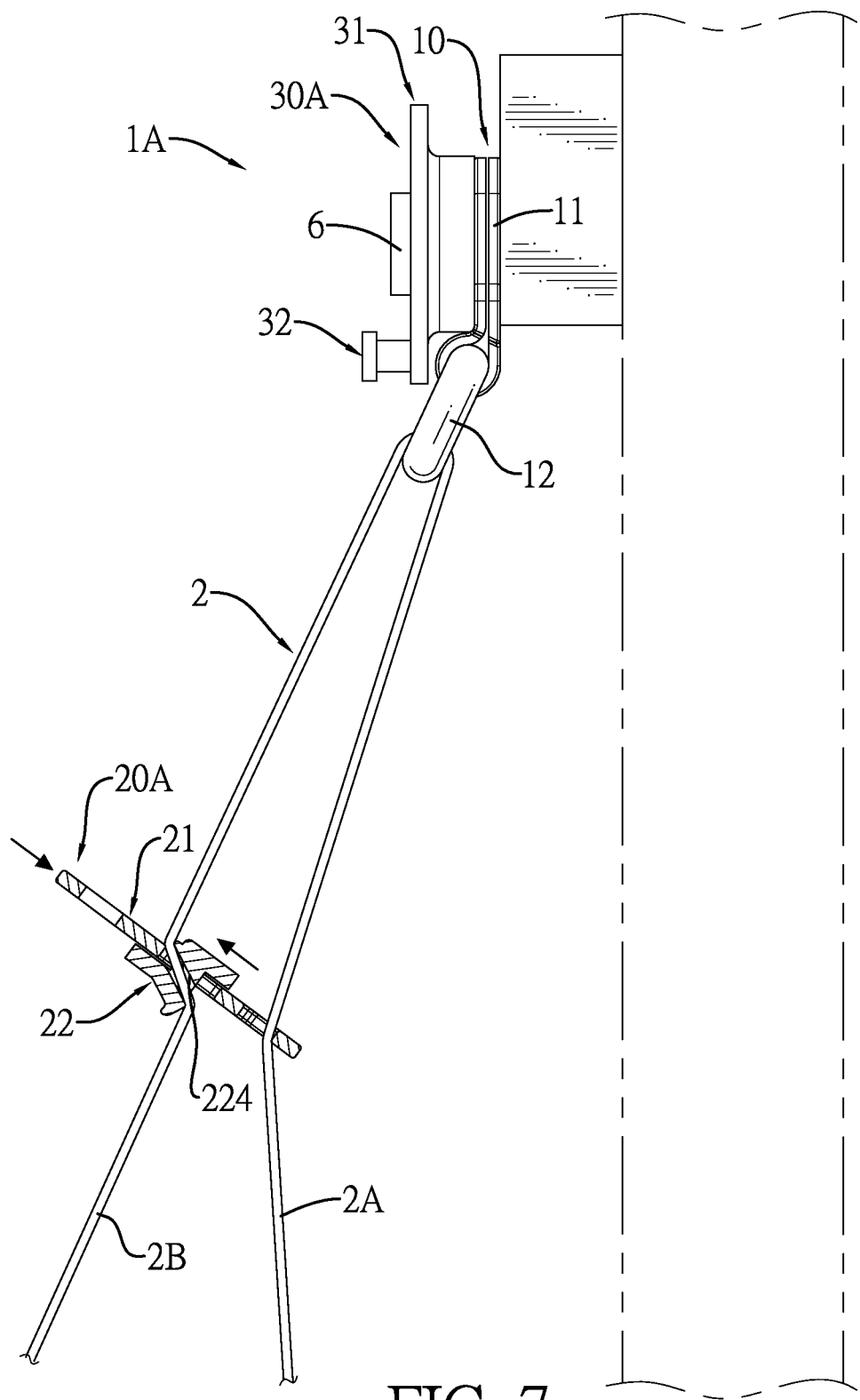
FIG. 7 is an operational front side view in partial section of the webbing height adjustment device in FIG. 4, showing the webbing is in a locked state.

With reference to FIGS. 6 and 7, in the first embodiment, the webbing height adjustment device 1A can be adjusted to locate at a height position of a positioning point of the webbing 2 by the occupant. The frame 21 or the slider 22 of the locking assembly 20A can be held by one hand of the occupant. The relative motion between the frame 21 and the slider 22 is generated to unlock the rear section 2B of the webbing 2. The frame 21 is pushed upwardly, or the slider 20 is pulled downwardly with continuously adjustment. When the webbing height adjustment device 1A moves to a suitable position, the webbing height adjustment device 1A can be released. Under the tension of the webbing 2, the frame 21 and the slider 22 relatively move to secure the rear section 2B, and the webbing height adjustment device 1A generates sufficient friction to lock the webbing 2 automatically. The rear section 2B between the tongue 4 and the top ring member 10 is not allowed to move relative to the webbing height adjustment device 1A.

After the height of the webbing height adjustment device 1A is adjusted upwardly or downwardly, the locking assembly 20A can be released by the occupant. Under the tension of the webbing 2, the frame 21 and the slider 22 relatively move to secure the rear section 2B, and the webbing height adjustment device 1A generates sufficient friction to lock the webbing 2 automatically. The rear section 2B between the tongue 4 and the top ring member 10 is not allowed to move relative to the webbing height adjustment device 1A.

Figure 8:
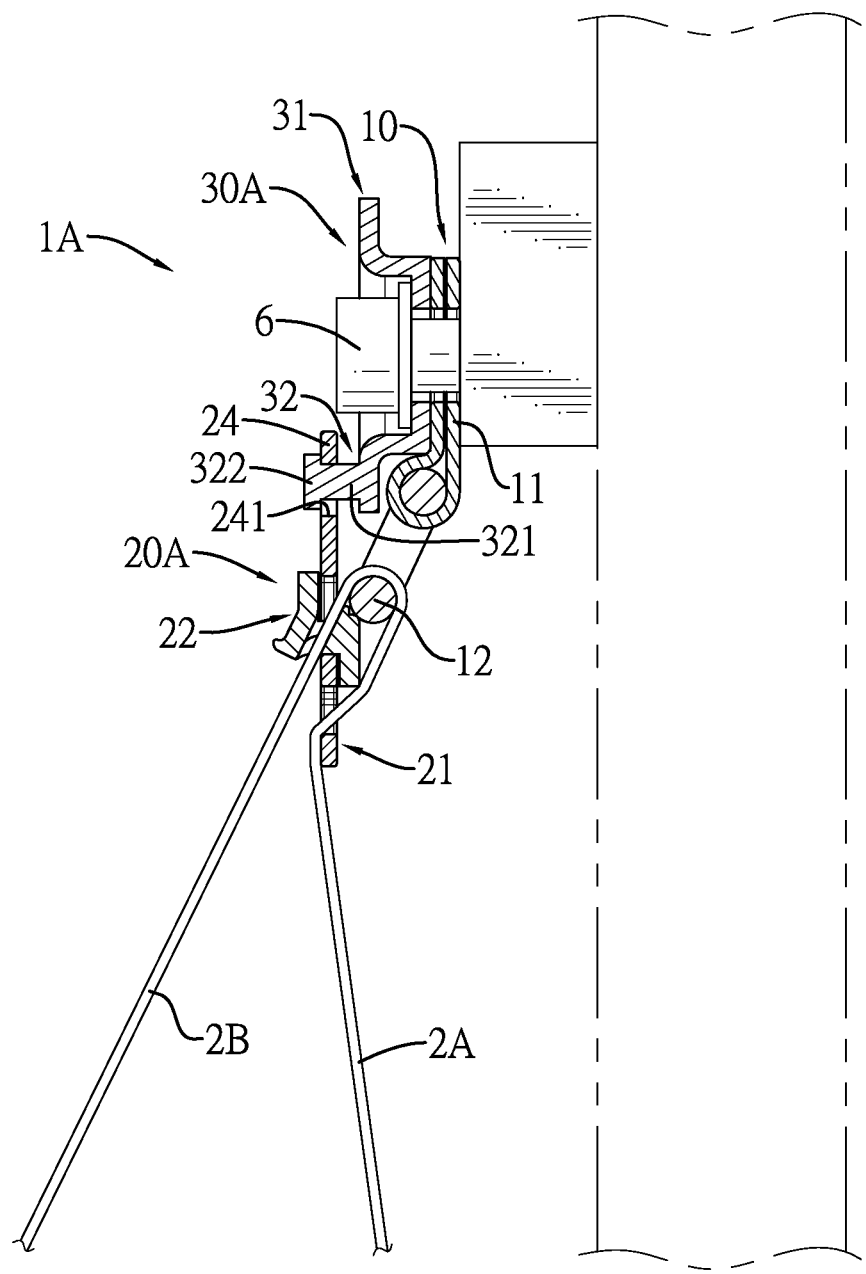
FIG. 8 is an operational front side view in partial section of the webbing height adjustment device in FIG. 4, showing a locking assembly is retained on a positioning member.

When the first embodiment of the webbing height adjustment device 1A is not in use, or the height position of the positioning point of the webbing 2 is not in adjustment, with reference to FIGS. 1 and 8, the positioning portion 24 of the frame 21 hangs on the combining portion 32 of the positioning member 30A located at the side surface of the top ring member 10. The locking assembly 20A is oscillated relative to the positioning member 30A. The frame 21 and the slider 22 of the locking assembly 20A are unlocked relative to the webbing 2. The webbing 2 can be pulled freely. The locking assembly 20A is oscillated relative to the positioning member 30A for preventing the webbing 2 from rubbing.

Figure 9:
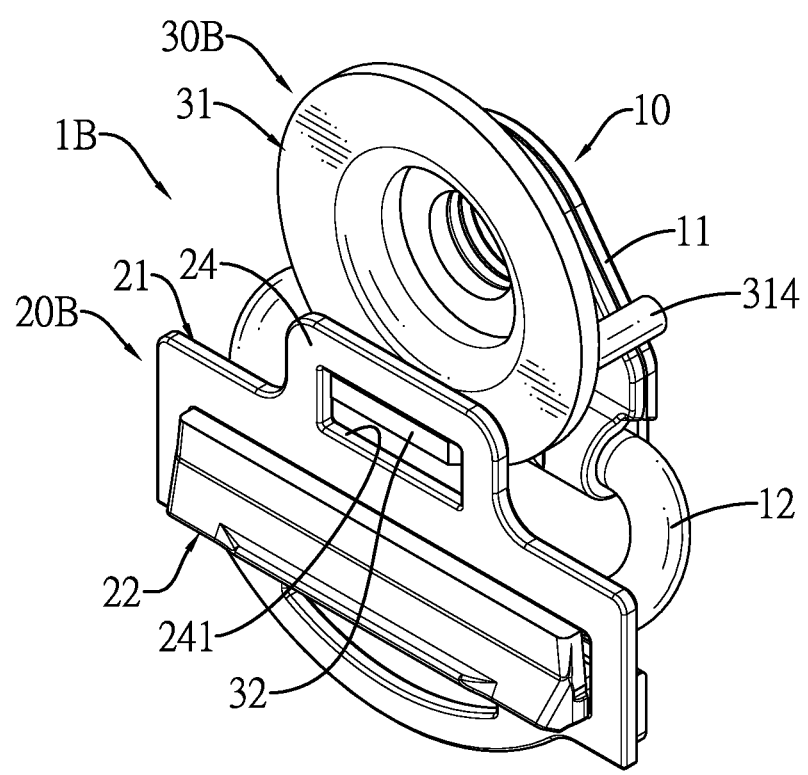
FIG. 9 is a perspective view of a second embodiment of a webbing height adjustment device in accordance with the present invention.
Figure 10:
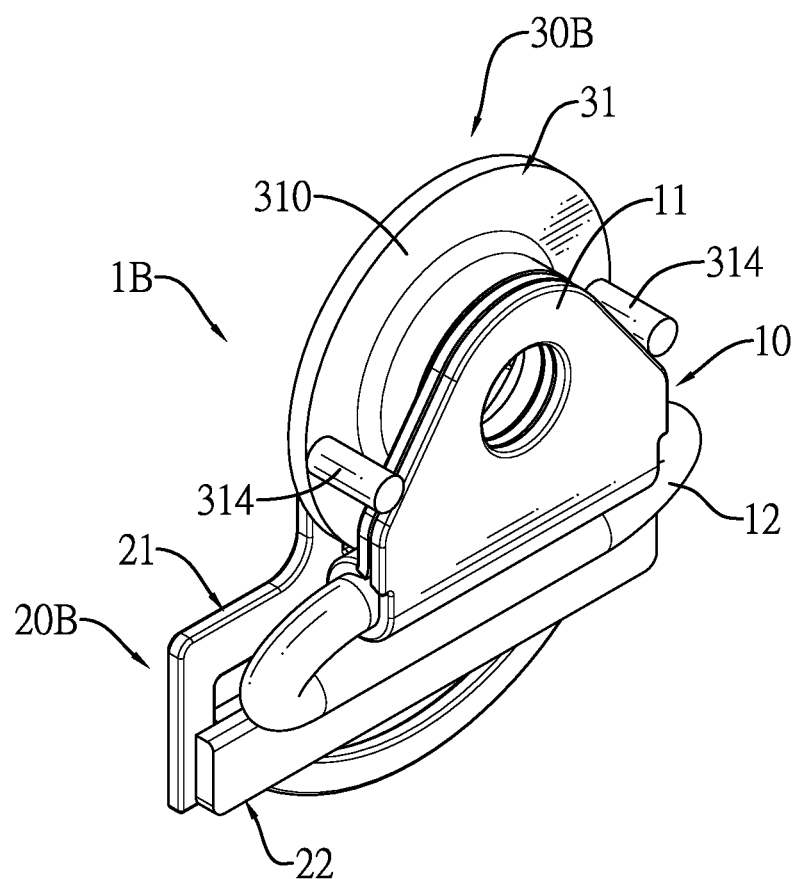
FIG. 10 is another perspective view of the webbing height adjustment device in FIG. 9.
Figure 11:
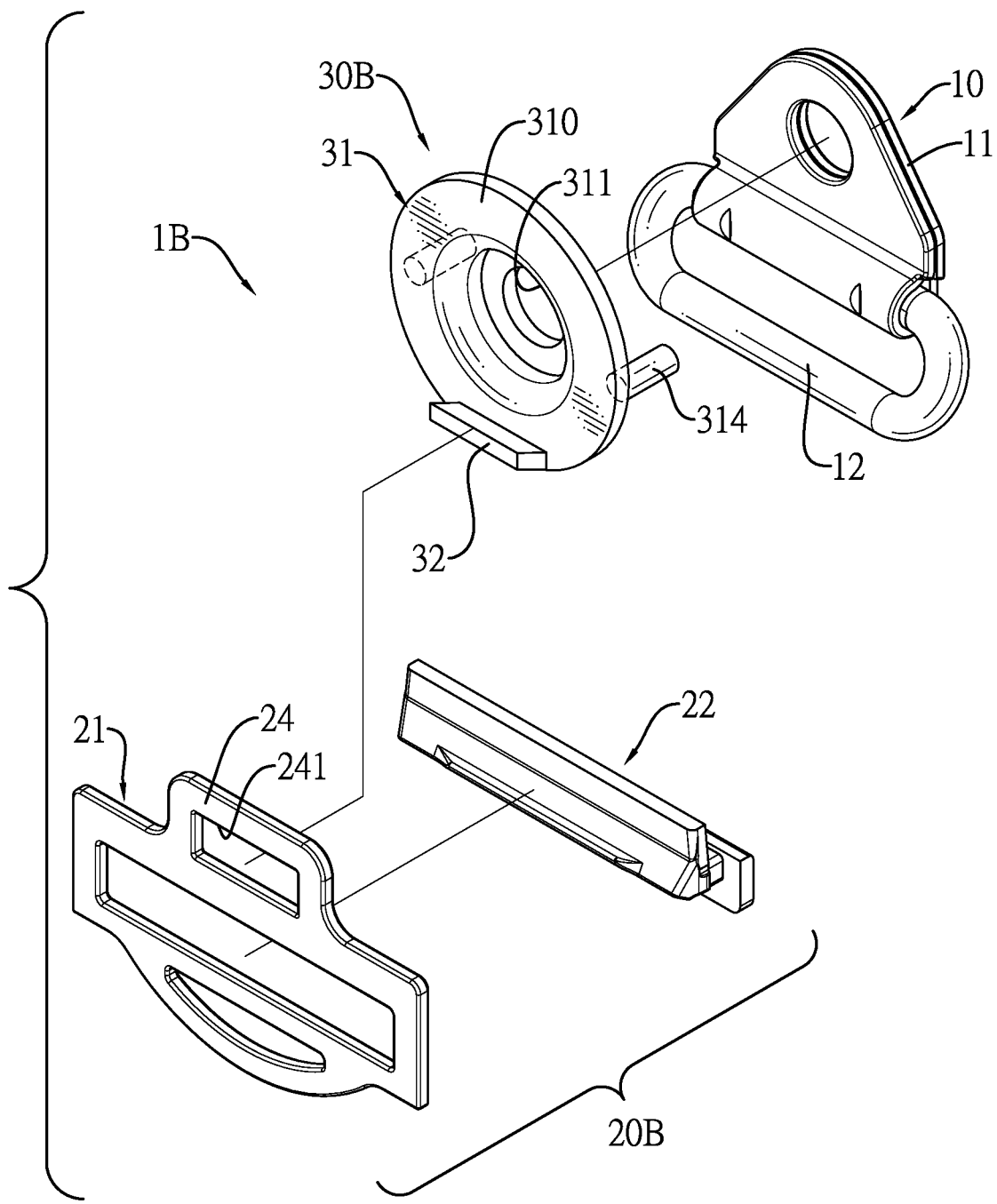
FIG. 11 is an exploded perspective view of the webbing height adjustment device in FIG. 9.

With reference to FIGS. 9 to 11, in a second embodiment of the webbing height adjustment device 1B, the webbing height adjustment device 1B has the ring member 10, the locking assembly 20B, and the positioning member 30B. Structure of the second embodiment of the webbing height adjustment device 1B is mostly similar to structure of the first embodiment of the webbing height adjustment device 1A. The locking assemblies 20A, 20B in the first embodiment and the second embodiment of the webbing height adjustment devices 1A, 1B selectively hang on the positioning members 30A, 30B disposed on the side surfaces of the top ring members 10 in the first embodiment and the second embodiment of the webbing height adjustment devices 1A, 1B. Same parts of the first embodiment and the second embodiment of the webbing height adjustment devices 1A, 1B will not be described herein. The difference between the first embodiment and the second embodiment of the webbing height adjustment devices 1A, 1B is in shape of the positioning members 30A, 30B.

With reference to FIGS. 9 to 11, in the second embodiment of the webbing height adjustment device 1B, the positioning member 30B has a positioning element 31 and a combining portion 32. The positioning element 31 has a base portion 310, a central hole 311 formed through the base portion 310, and two abutting rods 314. The two abutting rods 314 are formed on and protrude out of a back surface of the base portion 310. A threaded element 6 is inserted through the positioning element 31 and the retaining element 11 of the top ring member 10 for positioning the positioning element 31 and the retaining element 11 beside and above the seat. The base portion 310 of the positioning element 31 is fixed on the side surface of the retaining element 11. The two abutting rods 314 abut against the retaining element 11.

The combining portion 32 is disposed on a bottom section of the side surface of the positioning element 31 and is selectively inserted through the combining hole 241 of the positioning portion 24. The locking assembly 20B is combined with the positioning member 30B to hang on the side surface of the top ring member 10. Furthermore, the combining portion 32 is an elongated protrusion extending transversely. The combining hole 241 of the positioning portion 24 is an elongated hole corresponding to the combining portion 32. The combining portion 32 can be inserted into the combining hole 241 of the positioning portion 24.

With reference to FIGS. 9 to 11, the difference between the first embodiment and the second embodiment of the webbing height adjustment devices 1A, 1B is described as follows. In the second embodiment of the webbing height adjustment device 1B, the two abutting rods 314 are disposed on the back surface of the base portion 310 of the positioning element 31 and abut against two sides of the retaining element 11 of the top ring member 10, respectively. The combining portion 32 is the elongated protrusion and is inserted into the combining hole 241. In the first embodiment of the webbing height adjustment device 1A, the outer diameter of the end block 322 is larger than the outer diameter of the protruding rod 321. The end block 322 is disposed on the front end of the protruding rod 321. The end block 322 is inserted through the combining hole 241 of the positioning portion 24 is circular.

Operations of the first embodiment and the second embodiment of the webbing height adjustment devices 1A, 1B are mostly same. The operation of the second embodiment of the webbing height adjustment device 1B will not be described herein.

Figure 12:
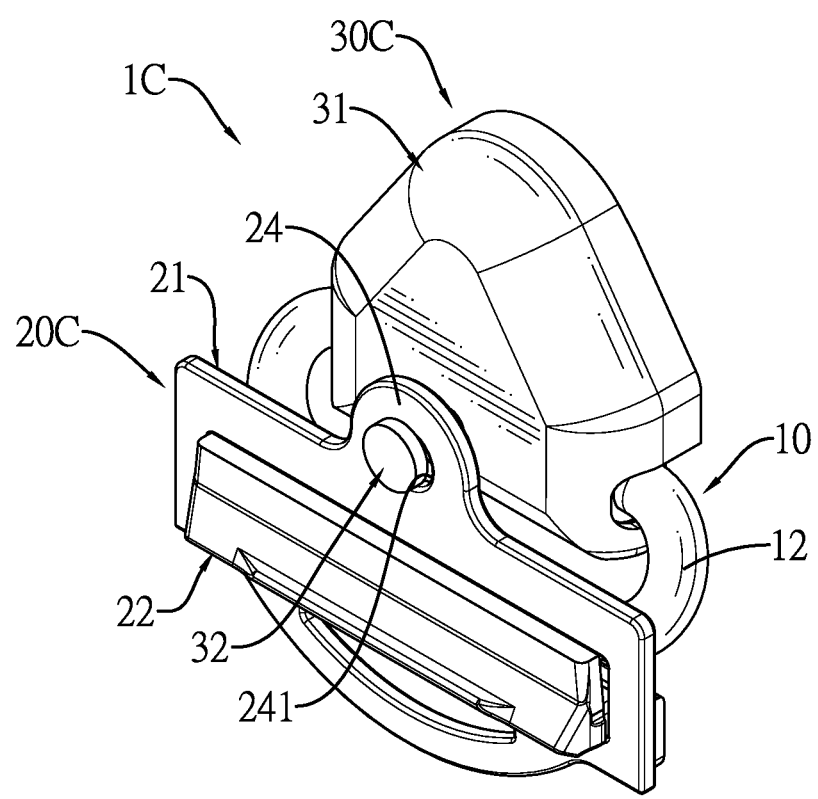
FIG. 12 is a perspective view of a third embodiment of a webbing height adjustment device in accordance with the present invention.
Figure 13:
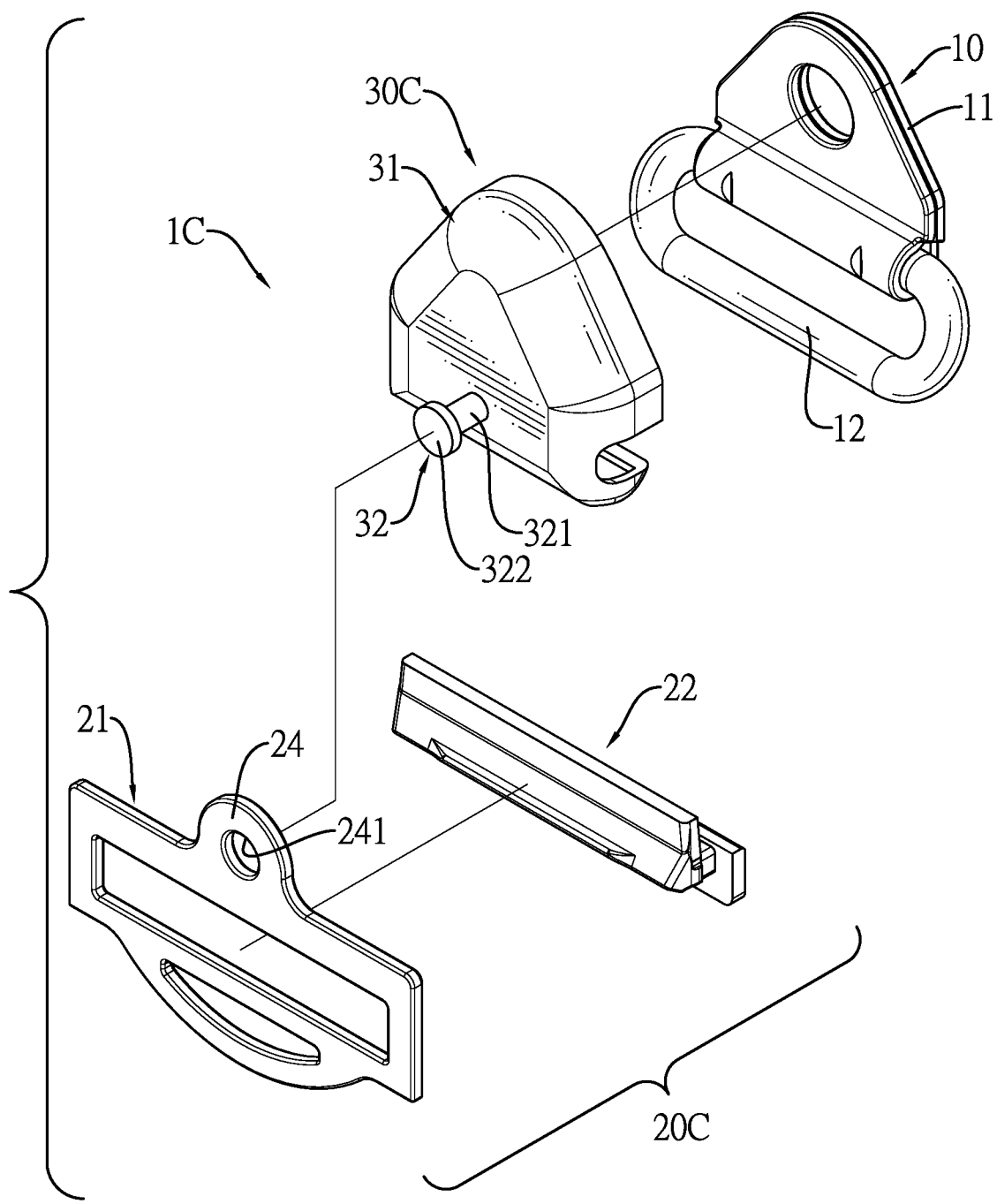
FIG. 13 is an exploded perspective view of the webbing height adjustment device in FIG. 12.

With reference to FIGS. 12 and 13, in a third embodiment of the webbing height adjustment device 1C, the webbing height adjustment device 1C has the top ring member 10, the locking assembly 20C, and the positioning member 30C. Structure of the third embodiment of the webbing height adjustment device 1C is mostly similar to structure of the first embodiment of the webbing height adjustment device 1A. The locking assembly 20A, 20C hangs on the positioning member 30A, 30C disposed on the side surface of the top ring member 10 in the first embodiment and the third embodiment of the webbing height adjustment devices 1A, 1C. Same parts between the first embodiment and the third embodiment of the webbing height adjustment devices 1A, 1C will not be described herein. The difference between the first embodiment and the third embodiment of the webbing height adjustment devices 1A, 1C is in assembling way.

With reference to FIGS. 12 and 13, in the third embodiment of the webbing height adjustment device 1C, the positioning member 30C has a positioning element 31 and a combining portion 32. The combining portion 32 is disposed on a side surface of a bottom section of the positioning element 31, and is selectively inserted through the combining hole 24 of the positioning portion 24 in the frame 21. The locking assembly 20C can hang on the positioning member 30C fixed on the top ring member 10. The locking assembly 20C can be oscillated relative to the positioning member 30C. The positioning element 31 is detachably disposed out of the side surface of the retaining element 11 of the top ring member 10 and is different from the positioning element 31 having the central hole 311 in the first embodiment of the webbing height adjustment device 1A. A threaded element 6 is inserted through the positioning element 31 and the retaining element 11 of the top ring member 10 for positioning beside and above the seat in the vehicle.

Operations of the first embodiment and the third embodiment of the webbing height adjustment devices 1A, 1C are mostly same. The operation of the third embodiment of the webbing height adjustment device 1C will not be described herein.

Figure 14:
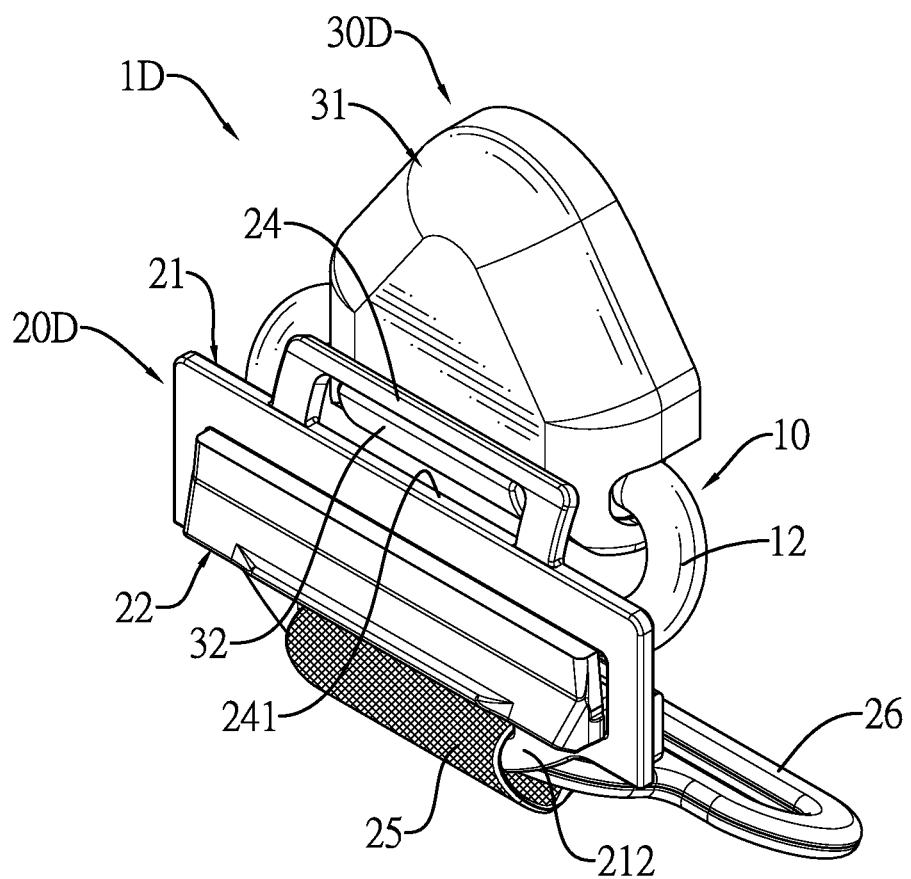
FIG. 14 is a perspective view of a fourth embodiment of a webbing height adjustment device in accordance with the present invention.
Figure 15:
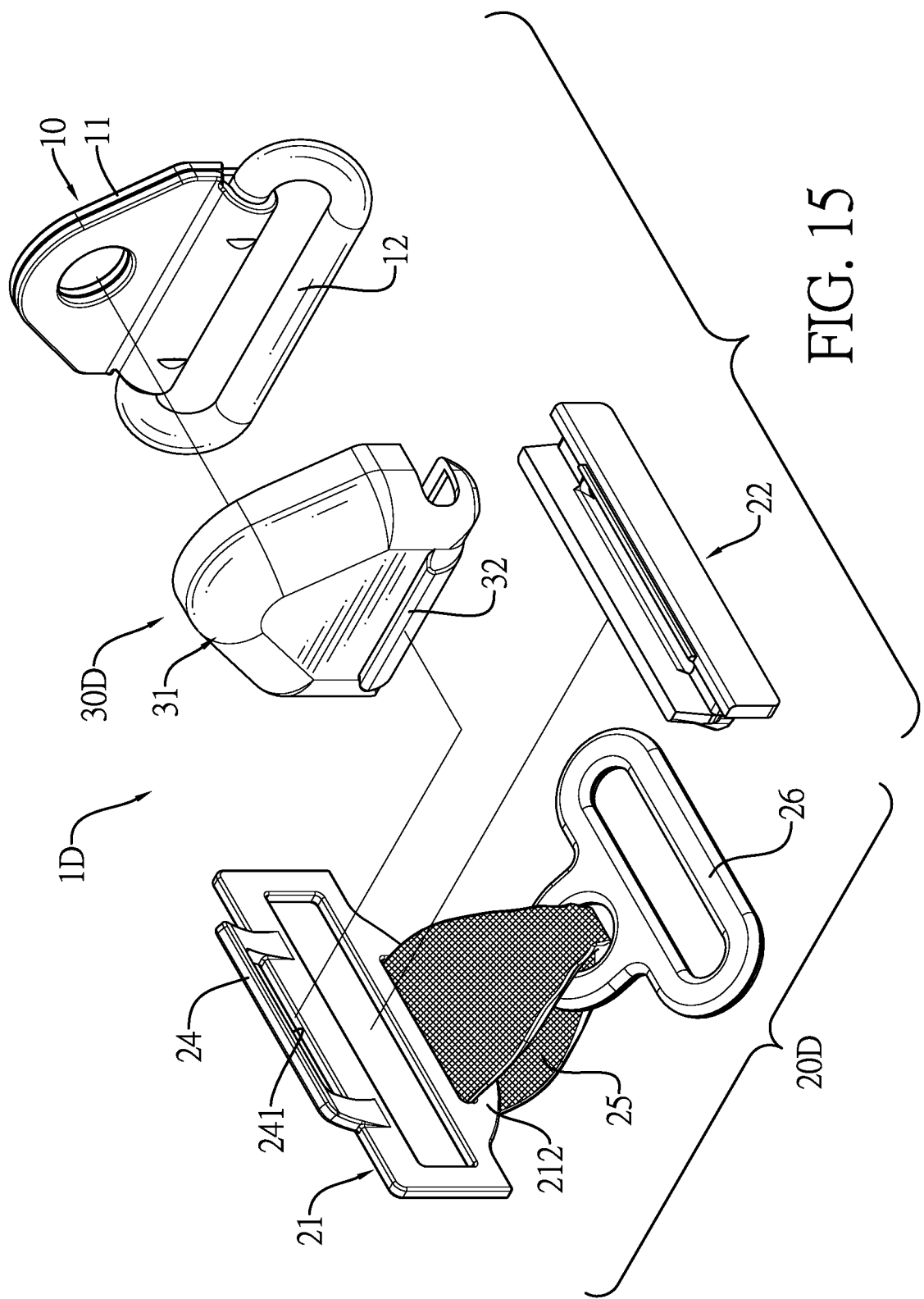
FIG. 15 is an exploded perspective view of the webbing height adjustment device in FIG. 14.

With reference to FIGS. 14 to 15, in a fourth embodiment of the webbing height adjustment device 1D, the webbing height adjustment device 1D has the ring member 10, the locking assembly 20D, and the positioning member 30D.

Structure of the fourth embodiment of the webbing height adjustment device 1D is mostly similar to structure of the first embodiment of the webbing height adjustment device 1A. The locking assemblies 20A, 20D in the first embodiment and the fourth embodiment of the webbing height adjustment devices 1A, 1D selectively hang on the positioning members 30A, 30D disposed on the side surfaces of the top ring members 10 in the first embodiment and the fourth embodiment of the webbing height adjustment devices 1A, 1D. Same parts of the first embodiment and the fourth embodiment of the webbing height adjustment devices 1A, 1D will not be described herein.

With reference to FIGS. 14 and 15, the difference between the first embodiment and the fourth embodiment of the webbing height adjustment devices 1A, 1D is in shape of the positioning member 30D. The positioning member 30D has a positioning element 31 and a combining portion 32. The combining portion 32 is disposed on a bottom section of the side surface of the positioning element 31 and is selectively inserted through the combining hole 241 of the positioning portion 24 being elongated. The locking assembly 20D can hang on the positioning member 30D disposed on the side surface of the top ring member 10. The positioning element 31 is detachably disposed out of the side surface of the retaining element 11 of the top ring member 10 and is different from the positioning element 30 having the central hole 311 in the first embodiment of the webbing height adjustment device 1A. A threaded element 6 is inserted through the positioning element 31 and the retaining element 11 of the top ring member 10 for positioning beside and above the seat in the vehicle.

Operations of the second embodiment and the fourth embodiment of the webbing height adjustment devices 1B, 1D are mostly same. The operation of the fourth embodiment of the webbing height adjustment device 1D will not be described herein.

With reference to FIGS. 16 to 19, in a fifth embodiment of the webbing height adjustment device 1E, the webbing height adjustment device 1E has the ring member 10, the locking assembly 20E, and the positioning member 30E. Structure of the fifth embodiment of the webbing height adjustment device 1E is mostly similar to structure of the first embodiment of the webbing height adjustment device 1A. Structure of the top ring member 10 in the fifth embodiment of the webbing height adjustment device 1E is same to structure of the top ring member 10 in the first embodiment of the webbing height adjustment device 1A. The top ring member 10 is disposed beside the seat in the vehicle. The webbing 2 disposed beside the seat is inserted through the top ring 12. The locking assembly 20E and the positioning member 30E are further changed.

With reference to FIGS. 16 to 19, the locking assembly 20E is moveably disposed out of the side surface of the top ring member 10 for locking or unlocking the sections of the webbing 2 located at two sides of the top ring 12. The locking assembly 20E has a frame 21, a slider 22, and a cover 23. The frame 21 and the slider 22 of the fifth embodiment of the webbing height adjustment device 1E are substantially same to the frame 21 and the slider 22 of the first embodiment of the webbing height adjustment device 1A. The slider 22 is moveably disposed in the frame 21. The webbing 2 is directly inserted through the connecting portion 212 in the frame 21. Or the connecting portion 212 can be connected to a connecting strap 25. The connecting strap 25 is connected to a connecting element 26. The webbing 2 is inserted through the connecting element 26. The connecting portion 212 of the frame 21 is indirectly connected to the webbing 2 by the connecting strap 25 and the connecting element 26 in series connection.

With reference to FIGS. 16 to 19, the frame 21 of the fifth embodiment of the webbing height adjustment device 1E omits the structure of the positioning portion 24 of the frame 21 shown in the first embodiment of the webbing height adjustment device 1A. The cover 23 having a positioning portion 24 is added to the fifth embodiment of the webbing height adjustment device 1E.

With reference to FIGS. 16 to 19, the cover 23 is moveably disposed out of the frame 21 connected to the slider 22 for driving the slider 22 to move relative to the frame 21. The cover 23 has a covering base 231 and two covering side plates 232. The covering base 231 has two side surfaces and a back surface. The two covering side plates 232 are respectively formed on the two side surfaces of the covering base 231 and are opposite to each other. A space is formed between the two covering side plates 232 and is located behind the back surface of the covering base 231. The cover 23 has a top stop portion 233. The top stop portion 233 is formed on a top section of the back surface of the covering base 231. The positioning portion 24 is disposed on a back surface of the top stop portion 233. The positioning portion 24 has a bottom end and a recess 242 formed on the bottom end of the positioning portion 24.

Each one of the two covering side plates 232 has a top surface, a bottom surface, an inner surface, a guiding groove 234, and a bottom wall 235. The guiding groove 234 is formed on the inner surface of the covering side plate 232, extends to the top surface of the top surface of the covering side plate 232, and has a bottom. The bottom wall 235 is formed on the bottom surface of the covering side plate 232 and is located at the bottom of the guiding groove 234. The back surface of the covering base 231 of the cover 23 faces the first plate portion 221 of the slider 22. The two longitudinal side portions 2112 are respectively inserted into the guiding grooves 234 of the two covering side plates 232 in the cover 23. The frame 21 can be slid upwardly and downwardly in the cover 23 and is positioned by the bottom walls 235 located below the longitudinal side portions 2112. The top stop portion 233 formed on the top section of the back surface of the covering base 231 is located above the first plate portion 221 of the slider 22.

With reference to FIGS. 16 to 19, the positioning member 30E is disposed on the side surface of the retaining element 11 of the top ring member 10. The positioning member 30E and the top ring member 10 are fixed beside and above the seat in the vehicle. The positioning member 30E is selectively connected to the locking assembly 20E to position the locking assembly 20E. The positioning member 30E has a positioning element 31 and a combining portion 32 being a cylinder. The positioning element 31 has a central hole 311 formed through the positioning element 31. The positioning element 31 and the retaining element 11 of the top ring member 10 are fixed beside and above the seat in the vehicle by a threaded element 6. The combining portion 32 is disposed on the bottom section of the side surface of the positioning element 31 and is selectively inserted and retained into the recess 242 of the positioning portion 24 of the cover 23 in the locking assembly 20E.

Figure 20:
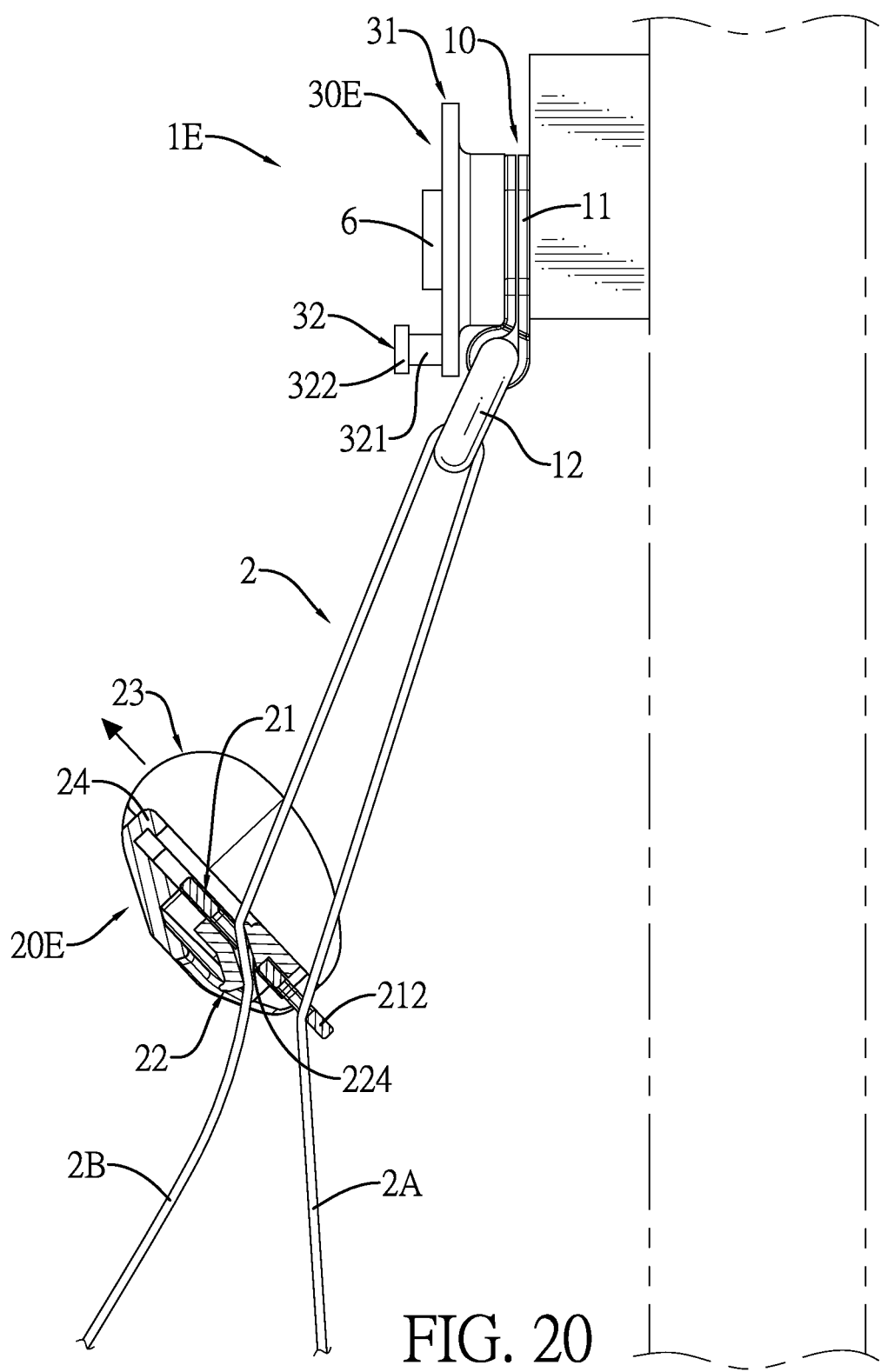
FIG. 20 is an operational front side view in partial section of the webbing height adjustment device in FIG. 16, showing a webbing is set in an unlocked state.

The fifth embodiment of the webbing height adjustment device 1E is applied to the seat belt system in the vehicle. With reference to FIG. 20, the retaining element 11 of the top ring member 10 and the positioning member 30E are fixed beside and above the seat in the vehicle by a threaded element 6. The webbing 2 is pulled from the retractor 3 located beside the seat and is passed through the connecting portion 212 of the frame 21. Then, the webbing 2 is passed through the top ring 12 of the top ring member 10 and the through slot 224 of the slider 22 located in the frame 21. The webbing 2 has a front section 2A and a rear section 2B. The front section 2A of the webbing 2 is defined between the top ring 12 and the retractor 3. The rear section 2B of the webbing 2 is connected to the front section 2A of the webbing 2 and is sequentially passed through the top ring 12, the cover 23, the frame 21, the slider 22, the tongue 4, and the retractor 3.

The occupant sits on the seat and the webbing 2 is fastened to abut the torso of the occupant. The tongue 4 connected to the rear section 2B is inserted into the buckle 5 located beside the seat. With reference to FIG. 20, in the fifth embodiment of the webbing height adjustment device 1E, the rear section 2B of the webbing 2 is locked or unlocked by the relative motion between the frame 21 and the slider 22. The webbing height adjustment device 1E forms a positioning sliding point between the front section 2A and the rear section 2B near the top ring member 10.

With reference to FIG. 20, the webbing height adjustment device 1E can be adjusted to locate at a height position of the positioning point of the webbing 2 by the occupant. The cover 23 can be held by one hand of the occupant. The relative motion between the frame 21 and the slider 22 is generated by the cover 23 for unlocking the rear section 2B of the webbing 2. The cover 23 is pushed upwardly or pulled downwardly. The fifth embodiment of the webbing height adjustment device 1E can be adjusted to a suitable position with continuously adjustment.

Figure 21:
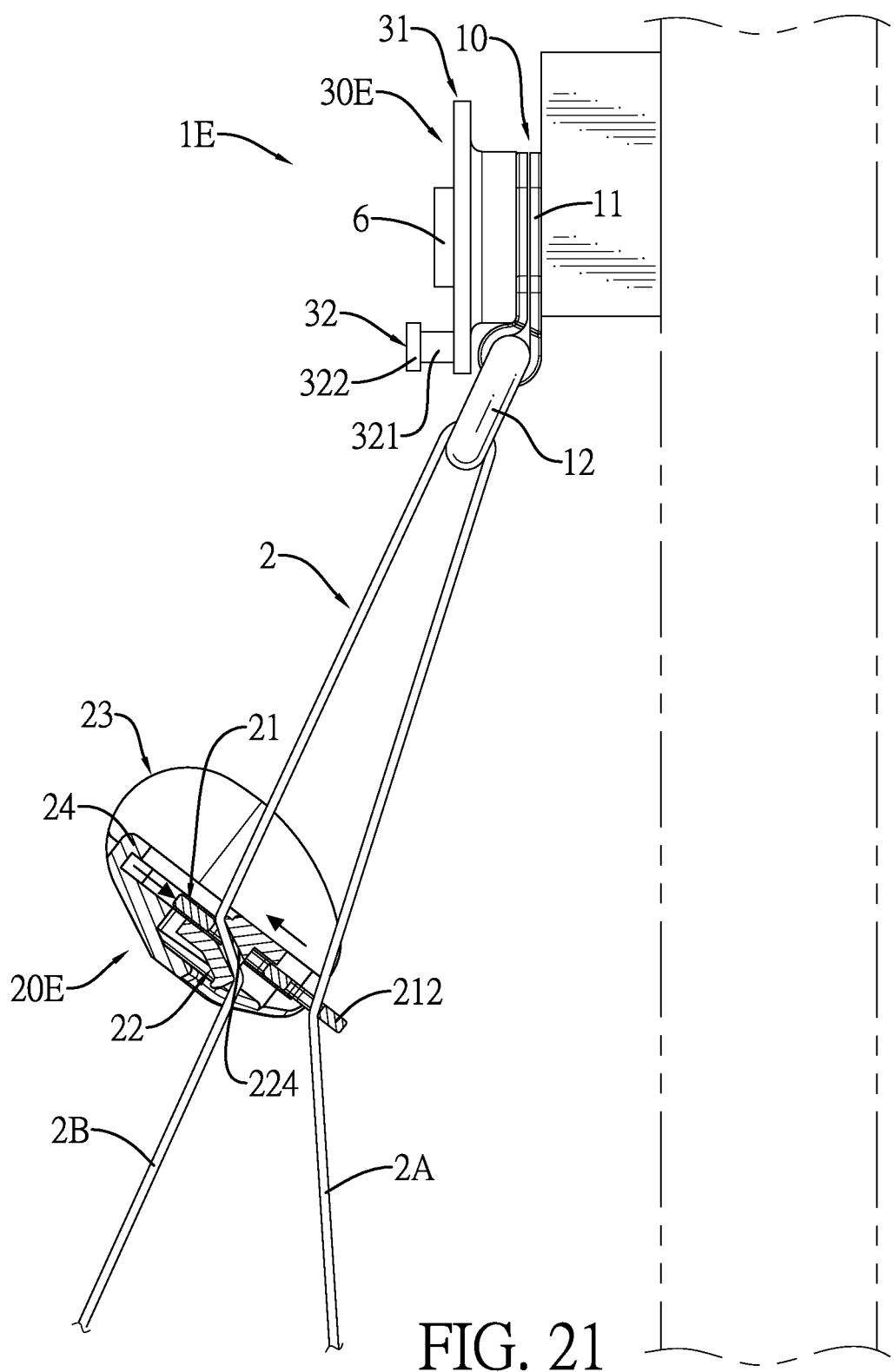
FIG. 21 is an operational front side view in partial section of the webbing height adjustment device in FIG. 16, showing the webbing is in a locked state.

With reference to FIG. 21, the webbing height adjustment device 1E is released, and under the tension of the webbing 2, the frame 21 and the slider 22 relatively move to secure the rear section 2B. The webbing height adjustment device 1E generates sufficient friction to lock the webbing 2 automatically. The rear section 2B between the tongue 4 and the top ring member 10 is not allowed to move relative to the webbing height adjustment device 1E. After the height of the webbing height adjustment device 1E on the webbing 2 is adjusted upwardly or downwardly, the cover 23 can be released by the occupant. Under the tension of the webbing 2, the frame 21 and the slider 22 relatively move to secure the rear section 2B. The rear section 2B between the tongue 4 and the top ring member 10 is not allowed to move relative to the webbing height adjustment device 1E.

Figure 16:
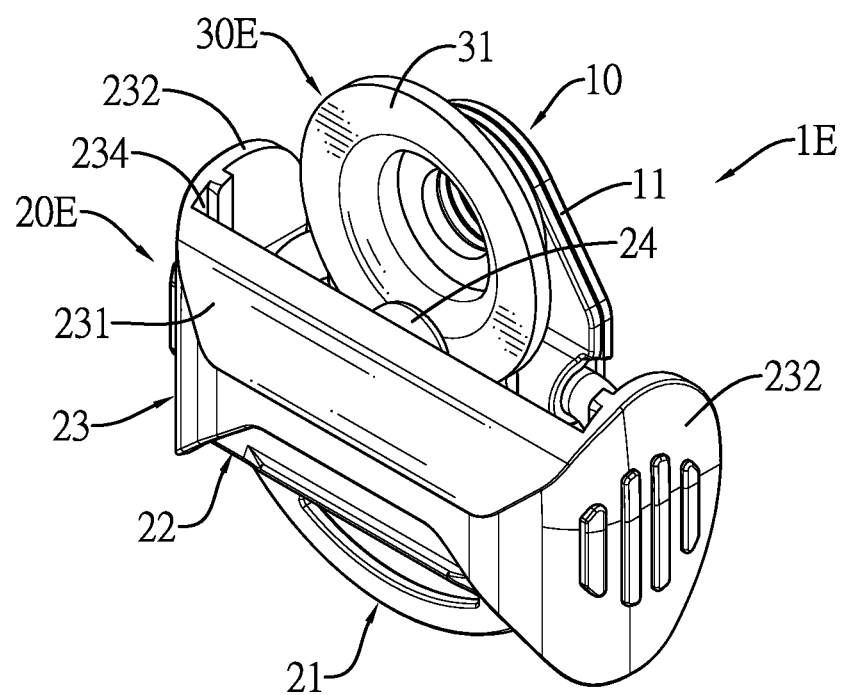
FIG. 16 is a perspective view of a fifth embodiment of a webbing height adjustment device in accordance with the present invention.
Figure 17:
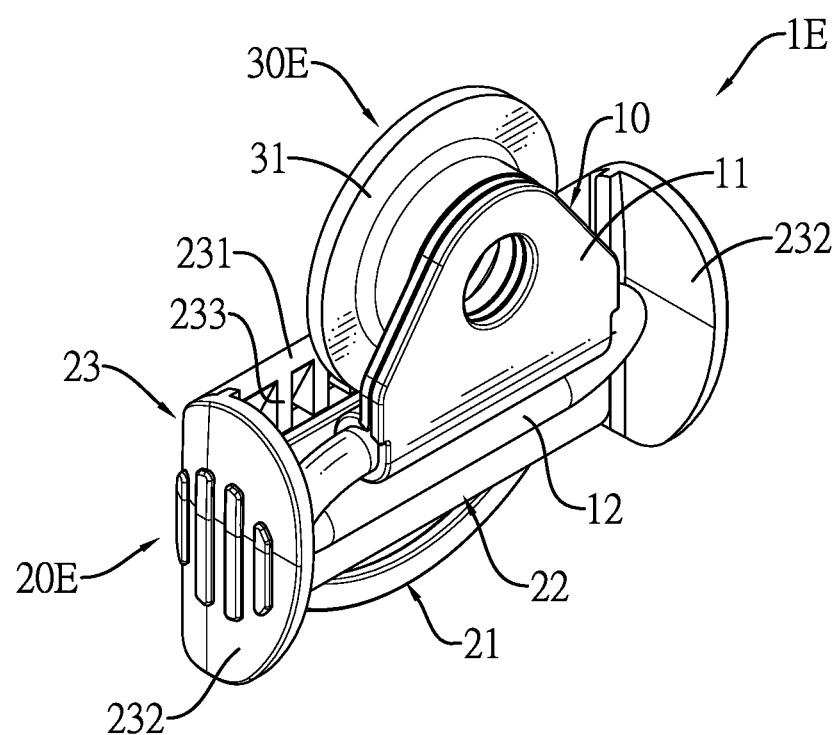
FIG. 17 is another perspective view of the webbing height adjustment device in FIG. 16.
Figure 18:
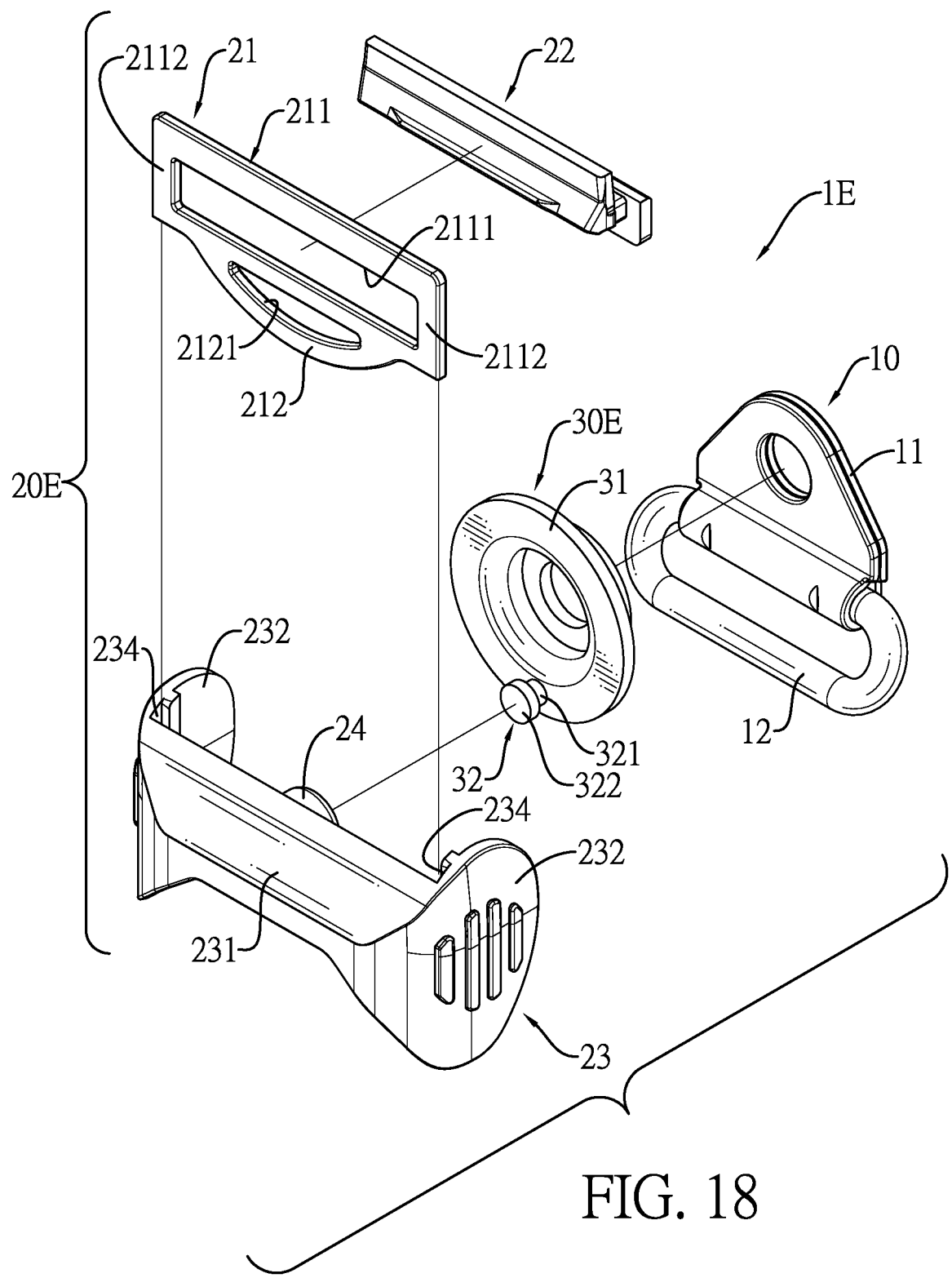
FIG. 18 is an exploded perspective view of the webbing height adjustment device in FIG. 16.
Figure 19:
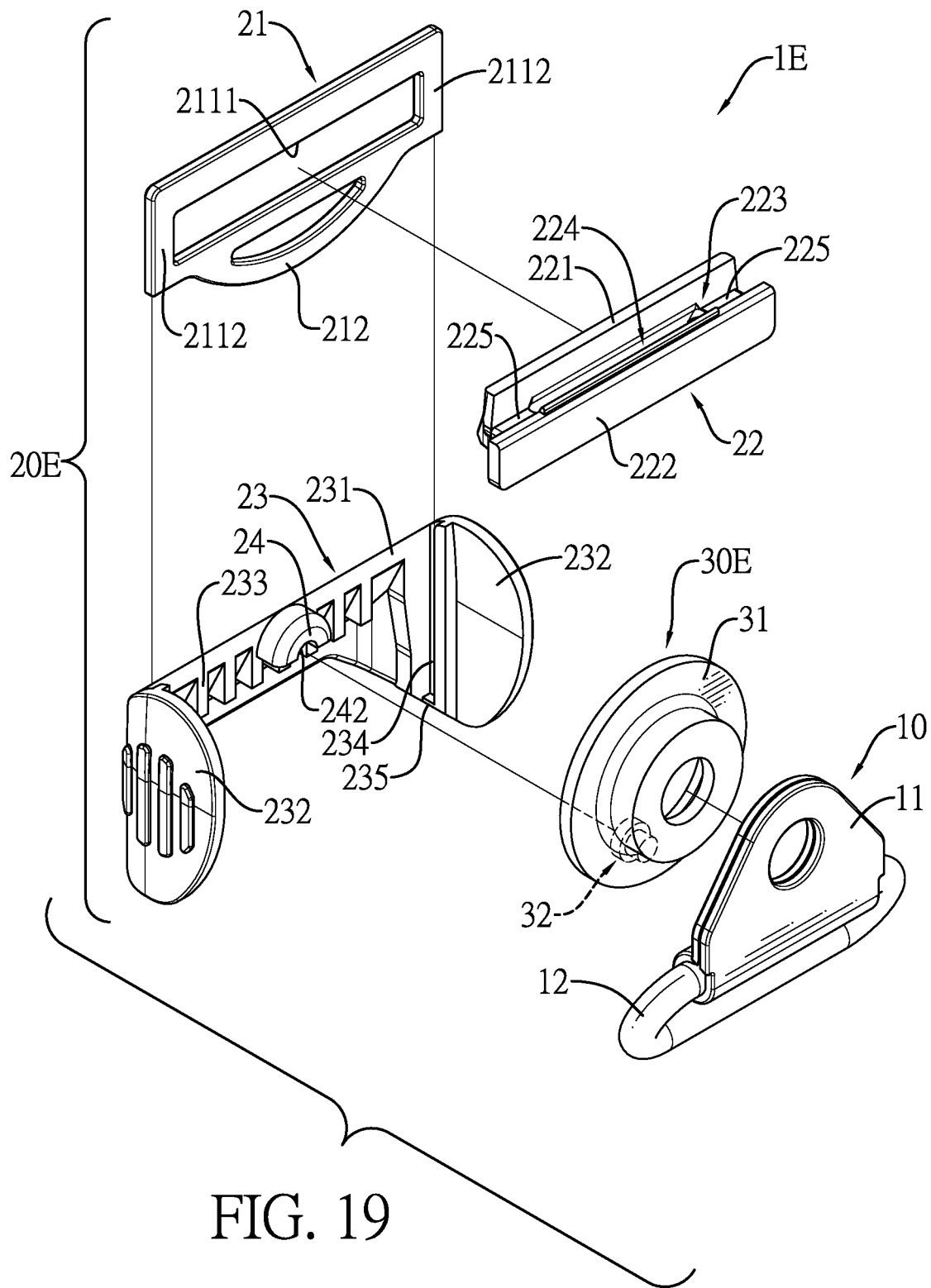
FIG. 19 is another exploded perspective view of the webbing height adjustment device in FIG. 16.
Figure 22:
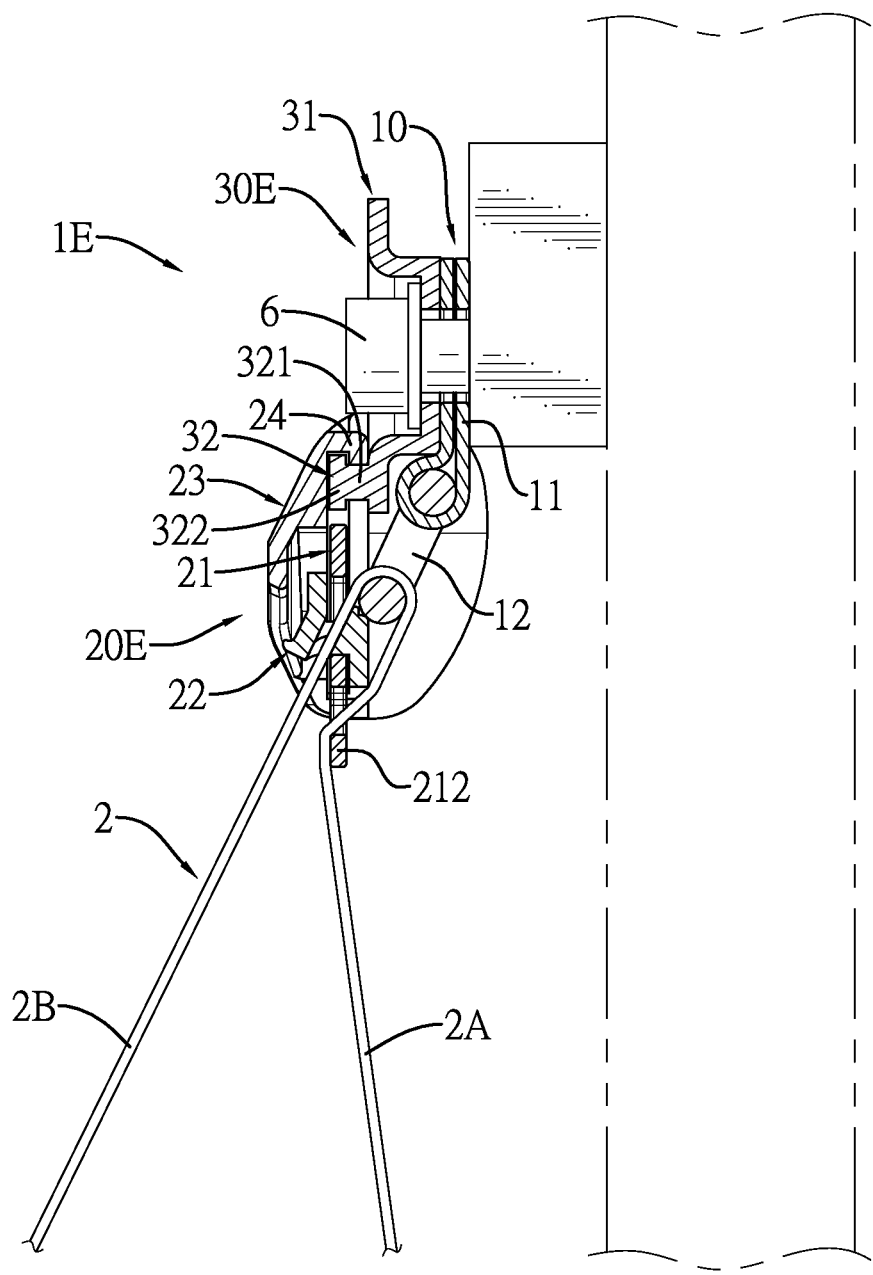
FIG. 22 is an operational front side view in partial section of the webbing height adjustment device in FIG. 16, showing a locking assembly is attracted on a positioning member.

With reference to FIGS. 22 and 16, the fifth embodiment of the webbing height adjustment device 1E is not in use, or the height position of the positioning point of the webbing 2 is not in adjustment, the cover 23 hangs on the positioning member 30E on the side surface of the top ring member 10. The frame 21 and the slider 22 in the cover 23 are unlocked relative to the webbing 2. The webbing 2 can be pulled freely.

With reference to FIGS. 23 to 26, in a sixth embodiment of the webbing height adjustment device 1F, the webbing height adjustment device 1F has the top ring member 10, the locking assembly 20F, and the positioning member 30F. Structure of the sixth embodiment of the webbing height adjustment device 1F is mostly similar to structure of the fifth embodiment of the webbing height adjustment device 1E. The locking assembles 20E, 20F selectively hang on the positioning members 30E, 30F disposed on the side surface of the top ring member 10 in the fifth embodiment and the sixth embodiment of the webbing height adjustment devices 1E, 1F, respectively. Same parts between the fifth embodiment and the sixth embodiment of the webbing height adjustment devices 1E, 1F will not be described herein. The difference between the fifth embodiment and the sixth embodiment or the webbing height adjustment devices 1E, 1F is in assembling way of the positioning member 30F.

Figure 23:
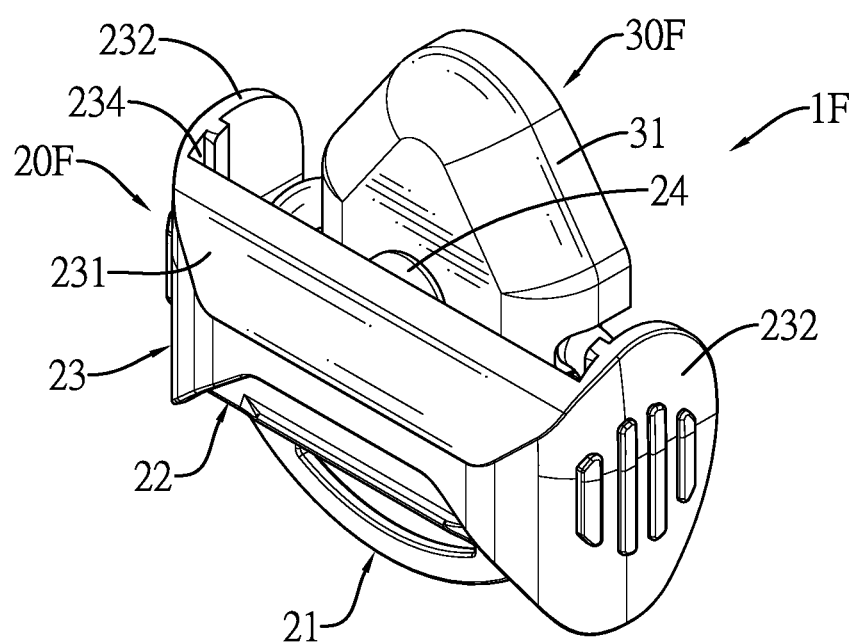
FIG. 23 is a perspective view of a sixth embodiment of a webbing height adjustment device in accordance with the present invention.
Figure 24:
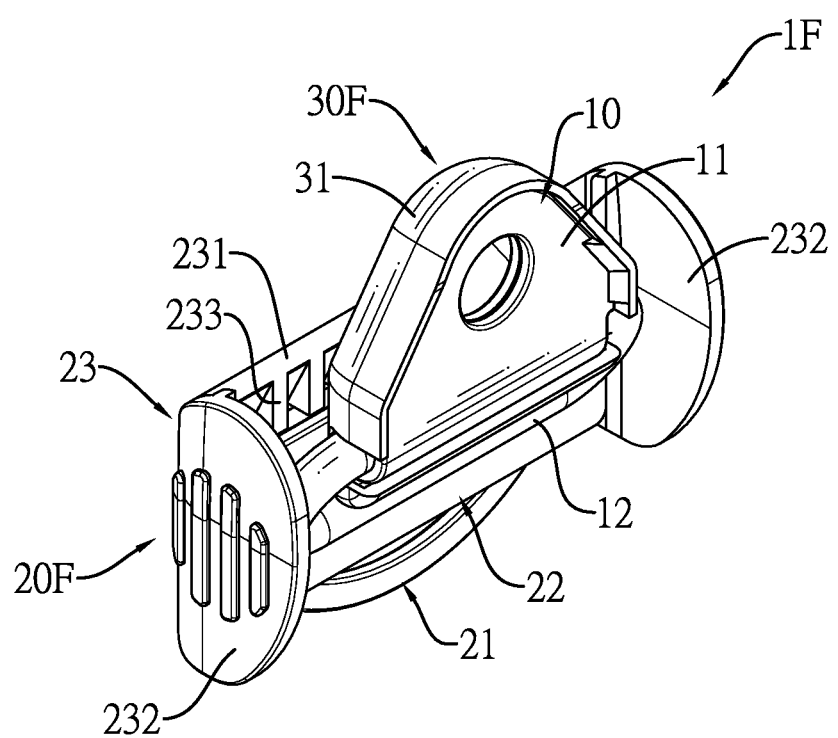
FIG. 24 is another perspective view of the webbing height adjustment device in FIG. 23.
Figure 25:
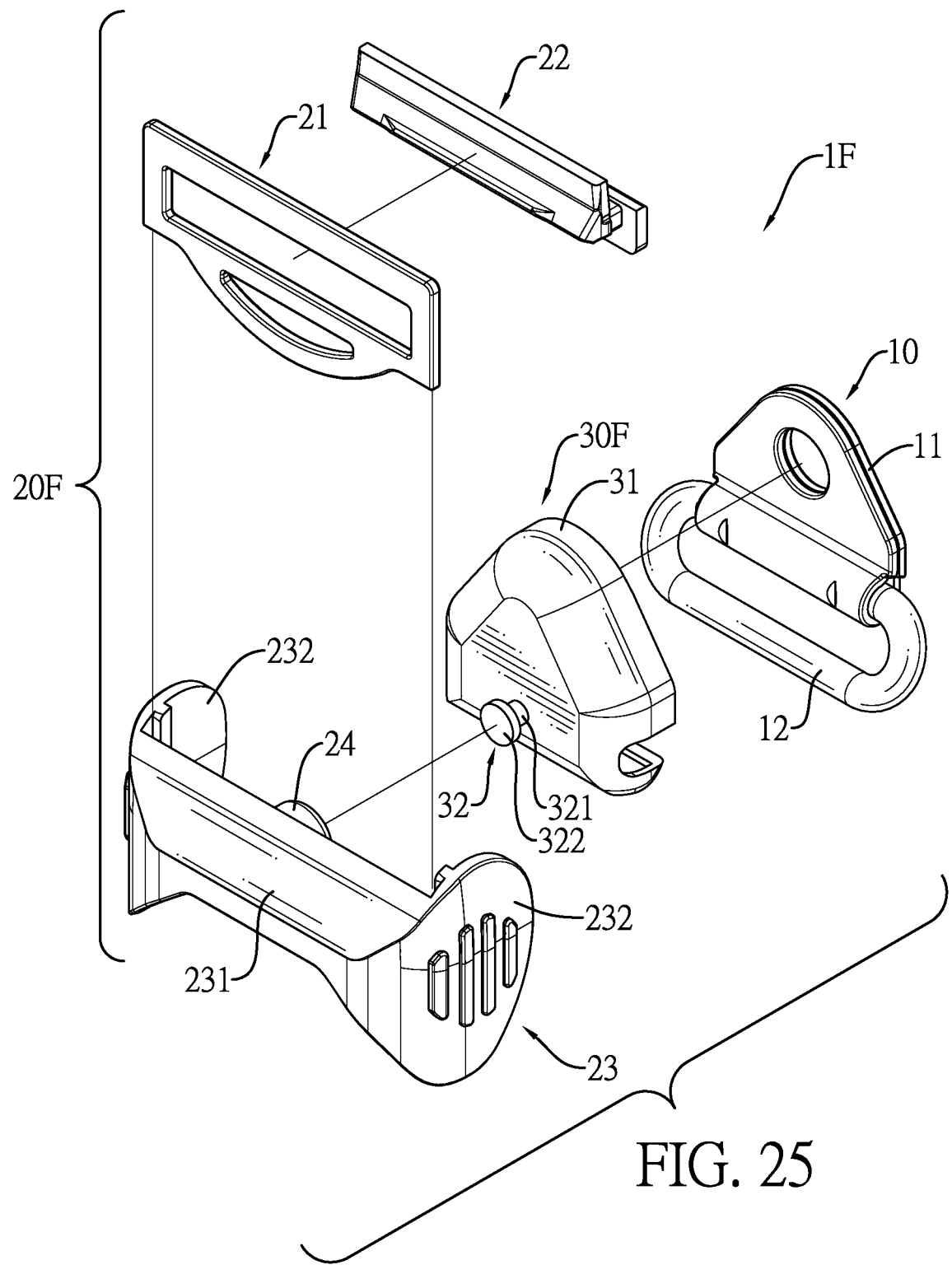
FIG. 25 is an exploded perspective view of the webbing height adjustment device in FIG. 23.
Figure 26:
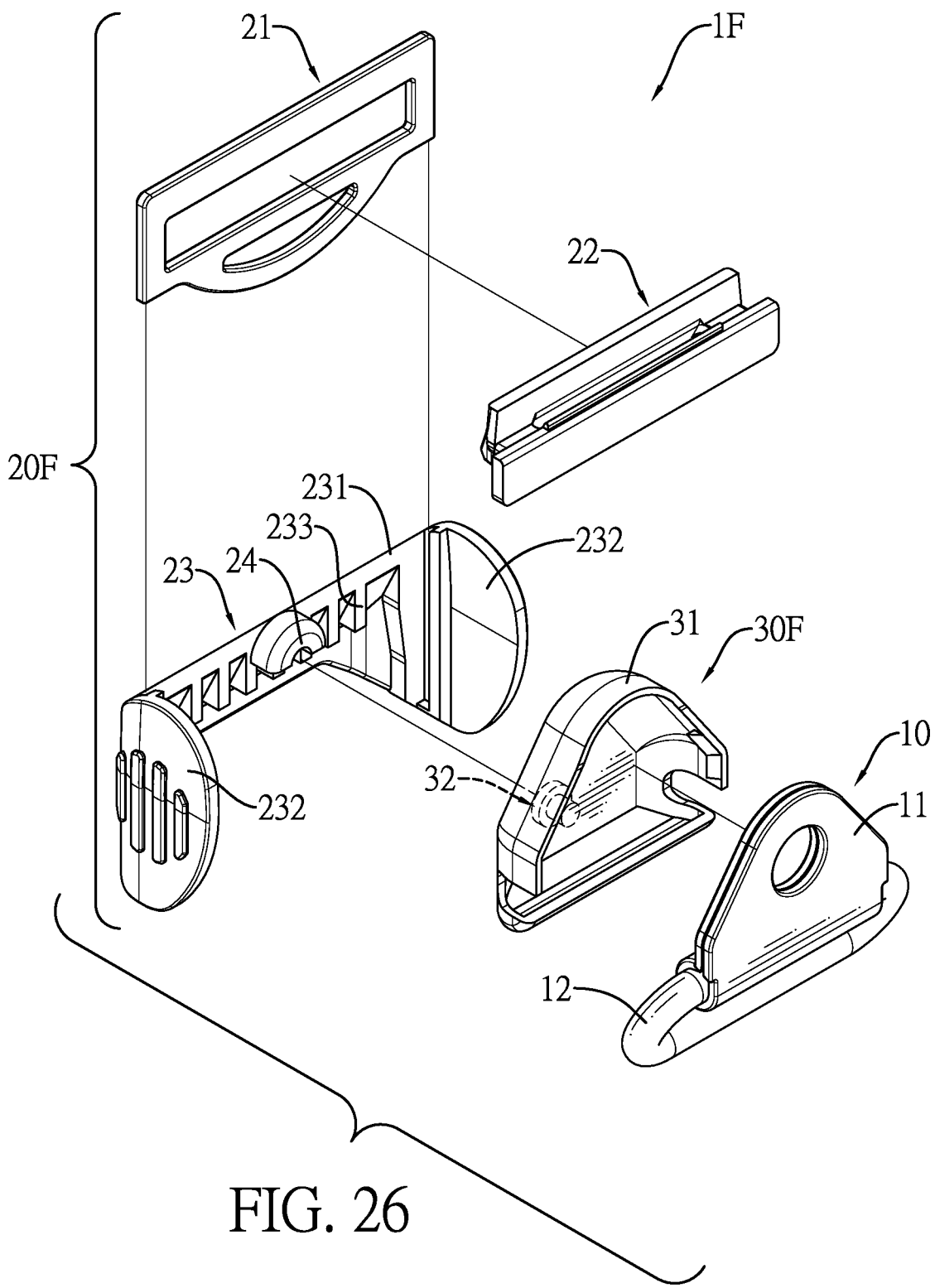
FIG. 26 is another exploded perspective view of the webbing height adjustment device in FIG. 23.

With reference to FIGS. 23 and 26, the positioning member 30F in the sixth embodiment of the webbing height adjustment device 1F has a positioning element 31 and a combining portion 32. The combining portion 32 is disposed on the bottom section of the side surface of the positioning element 31 and selectively hangs on the positioning portion 24. The locking assembly 20F can hang on the positioning member 30F fixed on the top ring member 10. The positioning element 31 is detachably disposed out of the retaining element 11 of the top ring member 10 and is different from the positioning element 31 having the central hole 311 in the fifth embodiment of the webbing height adjustment device 1E. A threaded element 6 is inserted through the positioning element 31 and the retaining element 11 of the top ring member 10 for positioning beside and above the seat in the vehicle.

Operations of the fifth embodiment and the sixth embodiment of the webbing height adjustment device 1E, 1F are mostly same. The operation of the sixth embodiment of the webbing height adjustment device 1F will not be described herein.

With reference to FIGS. 27 to 30, in a seventh embodiment of the webbing height adjustment device 1G, the webbing height adjustment device 1G has the ring member 10, the locking assembly 20G, and the positioning member 30G Structure of the seventh embodiment of the webbing height adjustment device 1G is mostly similar to structure of the fifth embodiment of the webbing height adjustment device 1E. The locking assembly 20E, 20G selectively hangs on the positioning member 30E, 30G disposed on the side surface of the top ring member 10 in the fifth embodiment and the seventh embodiment of the webbing height adjustment device 1E, 1G Same parts between the fifth embodiment and the seventh embodiment of the webbing height adjustment device 1E, 1G will not be described herein. The difference between the fifth embodiment and the seventh embodiment or the webbing height adjustment device 1E, 1G is in assembling way of the positioning member 30G.

Figure 27:
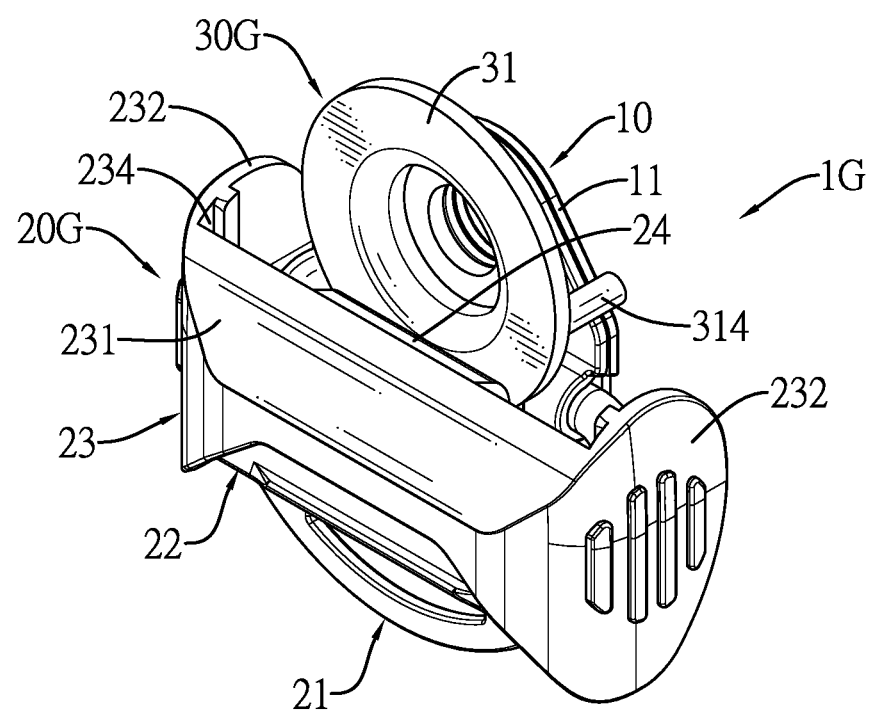
FIG. 27 is a perspective view of a seventh embodiment of a webbing height adjustment device in accordance with the present invention.
Figure 28:
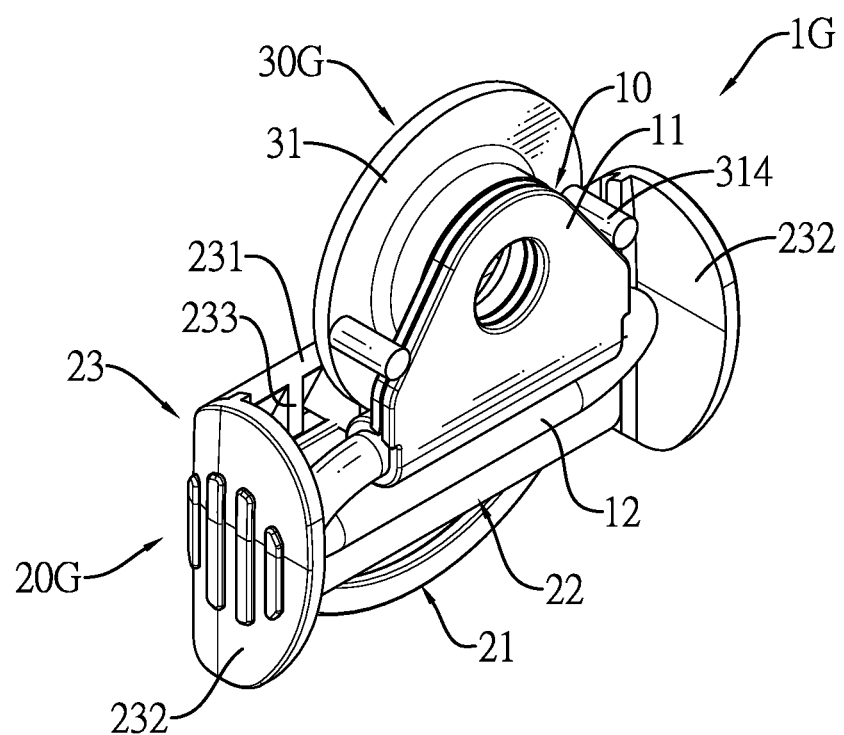
FIG. 28 is another perspective view of the webbing height adjustment device in FIG. 27.
Figure 29:
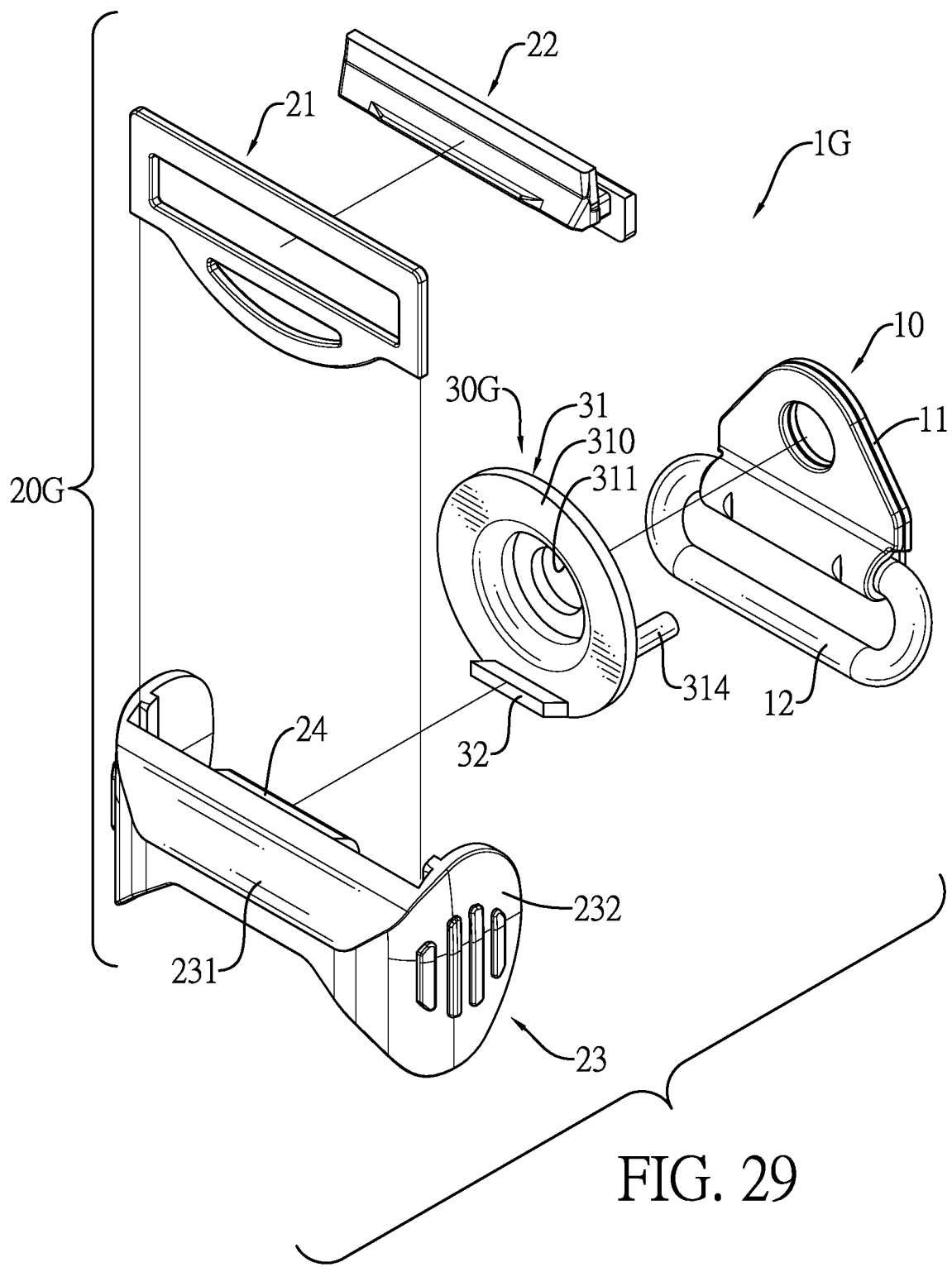
FIG. 29 is an exploded perspective view of the webbing height adjustment device in FIG. 27.
Figure 30:
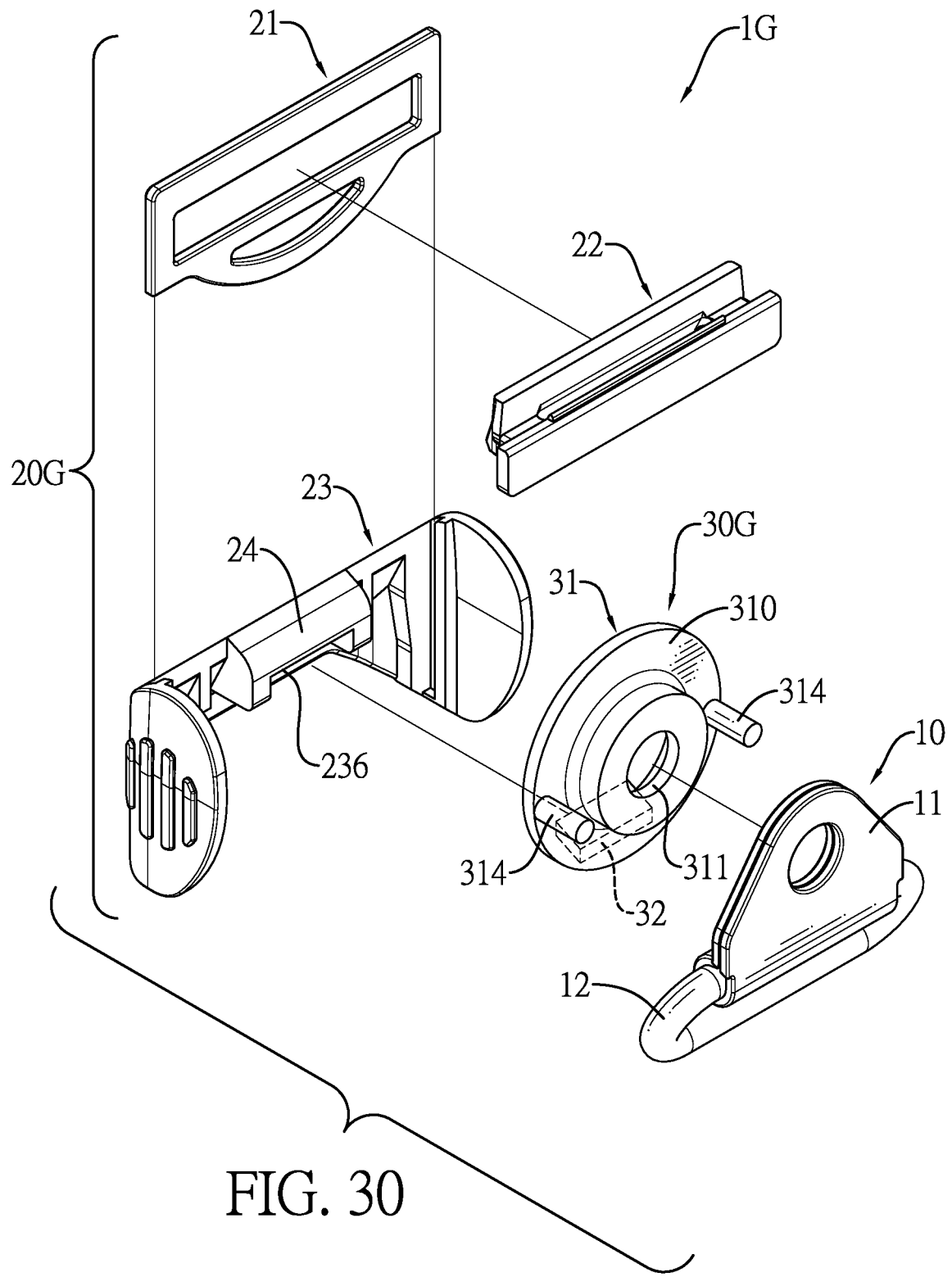
FIG. 30 is another exploded perspective view of the webbing height adjustment device in FIG. 27.

With reference to FIGS. 27 and 30, the positioning member 30G in the seventh embodiment of the webbing height adjustment device 1G has a positioning element 31 and a combining portion 32. The combining portion 32 is disposed on the bottom section of the side surface of the positioning element 31 and selectively hangs on the positioning portion 24. Furthermore, the combining portion 32 is an elongated protrusion extending transversely. The cover 23 has an elongated groove 236. The elongated groove 236 is formed on a bottom end of the positioning portion 24 of the cover 23. Shape of the elongated groove 236 corresponds to shape of the combining portion 32. The combining portion 32 can be inserted into the positioning portion 24 of the cover 23. The locking assembly 20G is able to hang on the positioning member 30G disposed on the side surface of the top ring member 10.

With reference to FIGS. 27 and 30, in the seventh embodiment of the webbing height adjustment device 1G, the positioning member 30G has a positioning element 31 and a combining portion 32. The positioning element 31 has a base portion 310, a central hole 311 formed through the base portion 310, and two abutting rods 314. The two abutting rods 314 are formed on and protrude out of a back surface of the base portion 310. A threaded element 6 is inserted through the positioning element 31 and the retaining element 11 of the top ring member 10 for positioning the positioning element 31 and the retaining element 11 beside and above the seat. The base portion 310 of the positioning element 31 is fixed on the side surface of the retaining element 11. The two abutting rods 314 abut against the retaining element 11. The locking assembly 20G is not allowed to oscillate relative to the positioning member 30G.

Operations of the fifth embodiment and the seventh embodiment of the webbing height adjustment device 1E, 1G are mostly same. The operation of the seventh embodiment of the webbing height adjustment device 1G will not be described herein.

Figure 31:
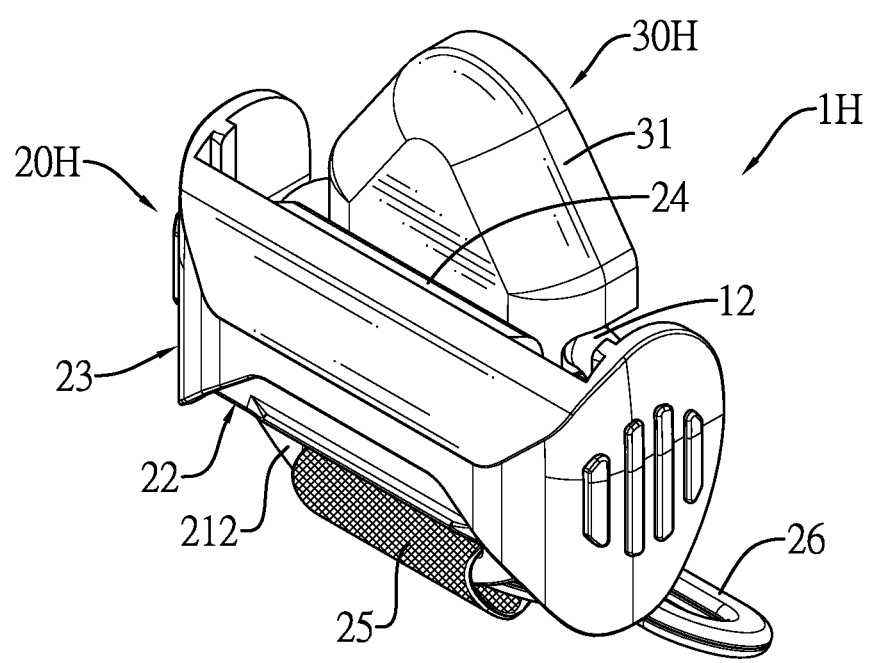
FIG. 31 is a perspective view of an eighth embodiment of a webbing height adjustment device in accordance with the present invention.
Figure 32:
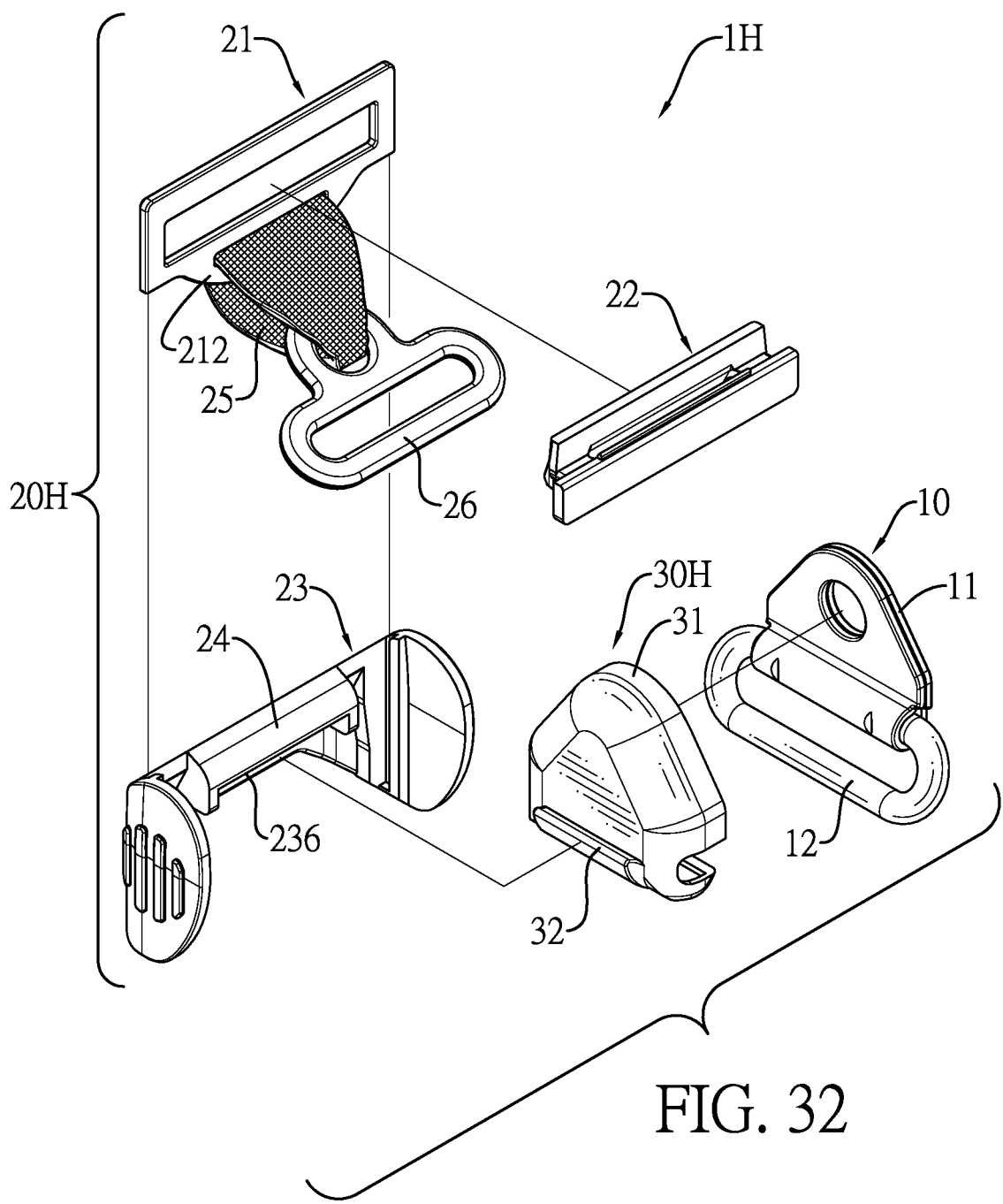
FIG. 32 is an exploded perspective view of the webbing height adjustment device in FIG. 31.

With reference to FIGS. 31 and 32, in an eighth embodiment of the webbing height adjustment device 1H, the webbing height adjustment device 1H has the ring member 10, the locking assembly 20H, and the positioning member 30H. Structure of the eighth embodiment of the webbing height adjustment device 1H is mostly similar to structure of the sixth embodiment of the webbing height adjustment device 1F. The locking assemblies 20F, 20H selectively hang on the positioning members 30F, 30H disposed on the side surfaces of the top ring members 10 in the sixth embodiment and the eighth embodiment of the webbing height adjustment device 1F, 1H. Same parts of the sixth embodiment and the eighth embodiment of the webbing height adjustment device 1F, 1H will not be described herein. With reference to FIGS. 31 and 32, the positioning member 30H in the eighth embodiment of the webbing height adjustment device 1H has a positioning element 31 and a combining portion 32. The combining portion 32 is disposed on a bottom section of the side surface of the positioning element 31 and selectively hangs on the positioning portion 24 of the cover 23. The locking assembly 20H is able to hang on the positioning member 30H disposed on the side surface of the top ring member 10.

The difference between the sixth embodiment and the eighth embodiment of the webbing height adjustment device 1F, 1H is described as follows. In the eighth embodiment of the webbing height adjustment device 1H, the combining portion 32 is an elongated protrusion extending transversely. The cover 23 has an elongated groove 236. The elongated groove 236 is formed on a bottom end of the positioning portion 24 of the cover 23. Shape of the elongated groove 236 corresponds to shape of the combining portion 32. The combining portion 32 can be inserted into the elongated groove 236 of the positioning portion 24 of the cover 23. In addition, the connecting portion 212 of the frame 21 can be connected to a connecting strap 25. The connecting strap 25 is connected to a connecting element 26. The webbing 2 is inserted through the connecting element 26. The connecting portion 212 of the frame 21 is indirectly connected to the webbing 2 by the connecting strap 25 and the connecting element 26 in series connection.

Operations of the sixth embodiment and the eighth embodiment of the webbing height adjustment device 1F, 1H are mostly same. The operation of the eighth embodiment of the webbing height adjustment device 1H will not be described herein.

Accordingly, the webbing height adjustment device 1A, 1B, 1C, 1D, 1E, 1F, 1G, 1H can be applied to the seat belt system in the vehicle. The height position of the top positioning point on the webbing 2 can be adjusted continuously by the webbing height adjustment device 1A, 1B, 1C, 1D, 1E, 1F, 1G, 1H. The webbing height adjustment device 1A, 1B, 1C, 1D, 1E, 1F, 1G, 1H is easy to operate and automatically locks the webbing 2. When the webbing height adjustment device 1A, 1B, 1C, 1D, 1E, 1F, 1G, 1H is not in use, the locking assembly 20A, 20B, 20C, 20D, 20E, 20F, 20G, 20H can move automatically and upwardly by the retracted webbing 2 and hangs on the positioning member 30A, 30B, 30C, 30D, 30E, 30F, 30G, 30H disposed on the side surface of the top ring member 10. The webbing height adjustment device 1A, 1B, 1C, 1D, 1E, 1F, 1G, 1H can be retracted beside and above the seat to save space. The webbing 2 can be pulled freely under an unlocked status.

What is claimed is:

1. A webbing height adjustment device being applied to connect to a webbing of a seat belt system, the webbing height adjustment device comprising:
   a top ring member having
      a side surface;
      a retaining element having a bottom end;
      a top ring connected to the bottom end of the retaining element, wherein the webbing is passed through the top ring; and
      a retaining hole formed through the retaining element;
   a locking assembly moveably disposed outside the side surface of the top ring member, and having
      a frame disposed outside the side surface of the top ring member and having
         a body disposed outside the side surface of the top ring member and having
            a bottom end;
            a through hole formed through the body;
            two sides; and
            two longitudinal side portions disposed at the two sides of the body; and
         a connecting portion formed on the bottom end of the body and having a connecting hole formed on the connecting portion, wherein the connecting portion is connected to a section of the webbing; and
      a slider moveably disposed in the body of the frame, and having two sides;
         a first plate portion disposed at one of the two sides of the slider;
         a second plate portion disposed at the other one of the two sides of the slider and opposite to the first plate portion; and
         a through portion formed between the first plate portion and the second plate portion, and having
            a through slot formed through the through portion, wherein another section of the webbing is inserted through the through slot, and the section of the webbing inserted through the through slot is locked or unlocked by a relative motion between the frame and the slider; and
   a positioning member disposed on the top ring member, clutched with the locking assembly, and having
      a positioning element disposed on the top ring member; and
      a combining portion disposed on the positioning element and selectively holding the locking assembly for positioning.

2. The webbing height adjustment device as claimed in claim 1, wherein
   the frame has
      a positioning portion formed on a top end of the body and having a combining hole formed through the positioning portion;
   the positioning element is disposed on a side surface of the retaining element of the top ring member, and has a central hole formed through the positioning element, wherein a threaded element is inserted through the positioning element and the retaining element for positioning the positioning element and the retaining element; and the combining portion is selectively inserted through the combining hole of the positioning portion in the frame for positioning the positioning portion, and has
- a protruding rod disposed on a side surface of the positioning element and having
  - a front end; and
  - a rear end opposite to the front end of the protruding rod and connected to the side surface of the positioning element; and
- an end block disposed on the front end of the protruding rod, wherein an outer diameter of the end block is larger than an outer diameter of the protruding rod, and the end block is capable of being inserted through the combining hole of the positioning portion.

3. The webbing height adjustment device as claimed in claim 1, wherein
the frame has
- a positioning portion formed on a top end of the body and having a combining hole formed through the positioning portion;

the positioning element is disposed on a side surface of the retaining element of the top ring member, and has
- a central hole formed through the positioning element, wherein a threaded element is inserted through the positioning element and the retaining element for positioning the positioning element and the retaining element; and
- two abutting rods disposed on a rear surface of the positioning element and abutting against the retaining element for positioning on the retaining element;

the combining hole is an elongated hole; and
the combining portion is an elongated rib and is selectively inserted into the combining hole.

4. The webbing height adjustment device as claimed in claim 1, wherein
the frame has
- a positioning portion formed on a top end of the body and having a combining hole formed through the positioning portion;

the positioning element is disposed outside and is retained on the retaining element of the top ring member; and
the combining portion is selectively inserted through the combining hole of the positioning portion in the frame for positioning the positioning portion, and has
- a protruding rod disposed on a side surface of the positioning element and having
  - a front end; and
  - a rear end opposite to the front end of the protruding rod and connected to the side surface of the positioning element; and
- an end block disposed on the front end of the protruding rod, wherein an outer diameter of the end block is larger than an outer diameter of the protruding rod, and the end block is capable of being inserted through the combining hole of the positioning portion.

5. The webbing height adjustment device as claimed in claim 1, wherein the connecting portion of the frame is connected to a connecting strap, the connecting strap is connected to a connecting element, and the webbing passes through the connecting element.

6. The webbing height adjustment device as claimed in claim 2, wherein the connecting portion of the frame is connected to a connecting strap, the connecting strap is connected to a connecting element, and the webbing passes through the connecting element.

7. The webbing height adjustment device as claimed in claim 3, wherein the connecting portion of the frame is connected to a connecting strap, the connecting strap is connected to a connecting element, and the webbing passes through the connecting element.

8. The webbing height adjustment device as claimed in claim 4, wherein the connecting portion of the frame is connected to a connecting strap, the connecting strap is connected to a connecting element, and the webbing passes through the connecting element.

9. The webbing height adjustment device as claimed in claim 1, wherein
the first plate portion of the slider and the second plate portion of the slider vertically deviate from each other, the first plate portion has a top surface, a bottom section, and a bottom end, the second plate portion has a top surface, a top section, and a top end, and the top surface of the first plate portion is higher than the top surface of the second plate portion;

the through portion of the slider is formed between the bottom section of the first plate portion and the top section of the second plate portion, and has
- two side walls disposed at two sides of the through slot, each one of the two side walls connected to the first plate portion and the second plate portion and having an outer surface; and
- two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls.

10. The webbing height adjustment device as claimed in claim 2, wherein
the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the through portion of the slider is formed between the bottom section of the first plate portion and the top section of the second plate portion, and has
- two side walls disposed at two sides of the through slot, each one of the two side walls connected to the first plate portion and the second plate portion and having an outer surface; and
- two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls.

11. The webbing height adjustment device as claimed in claim 3, wherein
the first plate portion of the slider and the second plate portion of the slider vertically deviate from each other, the first plate portion has a top surface, a bottom section, and a bottom end, the second plate portion has a top surface, a top section, and a top end, and the top surface of the first plate portion is higher than the top surface of the second plate portion;

the through portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls.

12. The webbing height adjustment device as claimed in claim 4, wherein the first plate portion of the slider and the second plate portion vertically deviate from each other, the first plate portion has a top surface, a bottom section, and a bottom end, the second plate portion has a top surface, a top section, and a top end, and the top surface of the first plate portion is higher than the top surface of the second plate portion;

the through portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots; and the through slot is sloped from the top end of the second plate portion toward the bottom end of the first plate portion and is located between the two side walls.

13. The webbing height adjustment device as claimed in claim 9, wherein the connecting portion of the frame is connected to a connecting strap, the connecting strap is connected to a connecting element, and the webbing passes through the connecting element.

14. The webbing height adjustment device as claimed in claim 10, wherein the connecting portion of the frame is connected to a connecting strap, the connecting strap is connected to a connecting element, and the webbing passes through the connecting element.

15. The webbing height adjustment device as claimed in claim 11, wherein the connecting portion of the frame is connected to a connecting strap, the connecting strap is connected to a connecting element, and the webbing passes through the connecting element.

16. The webbing height adjustment device as claimed in claim 12, wherein the connecting portion of the frame is connected to a connecting strap, the connecting strap is connected to a connecting element, and the webbing passes through the connecting element.

17. The webbing height adjustment device as claimed in claim 1, wherein the locking assembly has a cover moveably disposed around and outside the frame for driving the slider to move relative to the frame, and having a covering base having two side surfaces and a back surface; and two covering side plates respectively formed on the two side surfaces of the covering base and opposite to each other;

the locking assembly has a positioning portion disposed on and backwardly protruding out of the back surface of the covering base, and having a bottom end and a recess formed on the bottom end of the positioning portion;

the positioning element is disposed on a side surface of the retaining element of the top ring member, and has a central hole formed through the positioning element, wherein a threaded element is inserted through the positioning element and the retaining element for positioning the positioning element and the retaining element; and the combining portion is disposed on a bottom section of the positioning element, wherein the cover is selectively positioned on the combining portion by the positioning portion.

18. The webbing height adjustment device as claimed in claim 17, wherein the combining portion has a protruding rod disposed on the side surface of the positioning element and having a front end; and a rear end opposite to the front end of the protruding rod and connected to the side surface of the positioning element; and an end block disposed on the front end of the protruding rod, wherein an outer diameter of the end block is larger than an outer diameter of the protruding rod, and the end block is capable of being inserted into the recess of the positioning portion.

19. The webbing height adjustment device as claimed in claim 17, wherein the positioning element has two abutting rods, the two abutting rods are disposed on a rear surface of the positioning element and abut against the retaining element for positioning on the retaining element.

20. The webbing height adjustment device as claimed in claim 1, wherein the locking assembly has a cover moveably disposed around and outside the frame connected to the slider for driving the slider to move relative to the frame, and having a covering base having two side surfaces and a back surface; and two covering side plates respectively formed on the two side surfaces of the covering base and opposite to each other;

the locking assembly has a positioning portion disposed on and backwardly protruding out of the back surface of the covering base, and having a bottom end and a recess formed on the bottom end of the positioning portion;

the positioning element is disposed outside and is retained on the retaining element of the top ring member;

the combining portion is disposed on a bottom section of the positioning element, wherein the cover is selectively positioned on the combining portion by the positioning portion.

21. The webbing height adjustment device as claimed in claim 20, wherein the combining portion has
   a protruding rod disposed on the side surface of the positioning element and having
      a front end; and
      a rear end opposite to the front end of the protruding rod and connected to the side surface of the positioning element; and
   an end block disposed on the front end of the protruding rod, wherein an outer diameter of the end block is larger than an outer diameter of the protruding rod, and the end block is capable of being inserted into the recess of the positioning portion.

22. The webbing height adjustment device as claimed in claim 17, wherein the connecting portion of the frame is connected to a connecting strap, the connecting strap is connected to a connecting element, and the webbing passes through the connecting element.

23. The webbing height adjustment device as claimed in claim 18, wherein the connecting portion of the frame is connected to a connecting strap, the connecting strap is connected to a connecting element, and the webbing passes through the connecting element.

24. The webbing height adjustment device as claimed in claim 19, wherein the connecting portion of the frame is connected to a connecting strap, the connecting strap is connected to a connecting element, and the webbing passes through the connecting element.

25. The webbing height adjustment device as claimed in claim 20, wherein the connecting portion of the frame is connected to a connecting strap, the connecting strap is connected to a connecting element, and the webbing passes through the connecting element.

26. The webbing height adjustment device as claimed in claim 21, wherein the connecting portion of the frame is connected to a connecting strap, the connecting strap is connected to a connecting element, and the webbing passes through the connecting element.

27. The webbing height adjustment device as claimed in claim 17, wherein
   the first plate portion of the slider and the second plate portion of the slider vertically deviate from each other, the first plate portion has a top surface, a bottom section, and a bottom end, the second plate portion has a top surface, a top section, and a top end, and the top surface of the first plate portion is higher than the top surface of the second plate portion;
   the through portion of the slider is formed between the bottom section of the first plate portion and the top section of the second plate portion, and has
      two side walls disposed at two sides of the through slot, each one of the two side walls connected to the first plate portion and the second plate portion and having an outer surface; and
      two slide slots respectively formed on the outer surfaces of the two side walls, each one of the two slide slots located between the first plate portion and the second plate portion, wherein two longitudinal side portions of the body are respectively inserted into the two slide slots;
   the through slot is sloped from the top end of the second plate portion toward the bottom end of the first plate portion and is located between the two side walls;
   the cover has
      a top stop portion formed on the back surface of the covering base; and
      each one of the two covering side plates having
         a top surface;
         a bottom surface;
         an inner surface;
         a guiding groove formed on the inner surface of the covering side plate, extending to the top surface of the covering side plate, and having a bottom; and
         a bottom wall formed on the bottom surface of the covering side plate and located at the bottom of the guiding groove; and
   wherein two sides of the body of the frame are moveably inserted into the guiding grooves of the two covering side plates, and the top stop portion is located above the top surfaces of the two covering side plates.

28. The webbing height adjustment device as claimed in claim 18, wherein
   the first plate portion of the slider and the second plate portion of the slider vertically deviate from each other, the first plate portion has a top surface, a bottom section, and a bottom end, the second plate portion has a top surface, a top section, and a top end, and the top surface of the first plate portion is higher than the top surface of the second plate portion;
   the through portion of the slider is formed between the bottom section of the first plate portion and the top section of the second plate portion, and has
      two side walls disposed at two sides of the through slot, each one of the two side walls connected to the first plate portion and the second plate portion and having an outer surface; and
      two slide slots respectively formed on the outer surfaces of the two side walls, each one of the two slide slots located between the first plate portion and the second plate portion, wherein two longitudinal side portions of the body are respectively inserted into the two slide slots;
   the through slot is sloped from the top end of the second plate portion toward the bottom end of the first plate portion and is located between the two side walls;
   the cover has
      a top stop portion formed on the back surface of the covering base; and
      each one of the two covering side plates having
         a top surface;
         a bottom surface;
         an inner surface;
         a guiding groove formed on the inner surface of the covering side plate, extending to the top surface of the covering side plate, and having a bottom; and
         a bottom wall formed on the bottom surface of the covering side plate and located at the bottom of the guiding groove; and
   wherein two sides of the body of the frame are moveably inserted into the guiding grooves of the two covering side plates, and the top stop portion is located above the top surfaces of the two covering side plates.

29. The webbing height adjustment device as claimed in claim 19, wherein
   the first plate portion of the slider and the second plate portion of the slider vertically deviate from each other, the first plate portion has a top surface, a bottom section, and a bottom end, the second plate portion has a top surface, a top section, and a top end, and the top surface of the first plate portion is higher than the top surface of the second plate portion;
   the through portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots;

the through slot is sloped from the top end of the second plate portion toward the bottom end of the first plate portion and is located between the two side walls;

the cover has a top stop portion formed on the back surface of the covering base; and each one of the two covering side plates having a top surface;
a bottom surface;
an inner surface;
a guiding groove formed on the inner surface of the covering side plate, extending to the top surface of the covering side plate, and having a bottom; and
a bottom wall formed on the bottom surface of the covering side plate and located at the bottom of the guiding groove; and wherein two sides of the body of the frame are moveably inserted into the guiding grooves of the two covering side plates, and the top stop portion is located above the top surfaces of the two covering side plates.

30. The webbing height adjustment device as claimed in claim 20, wherein the first plate portion of the slider and the second plate portion of the slider vertically deviate from each other, the first plate portion has a top surface, a bottom section, and a bottom end, the second plate portion has a top surface, a top section, and a top end, and the top surface of the first plate portion is higher than the top surface of the second plate portion;

the through portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots;

the through slot is sloped from the top end of the second plate portion toward the bottom end of the first plate portion and is located between the two side walls;

the cover has a top stop portion formed on the back surface of the covering base; and each one of the two covering side plates having a top surface;
a bottom surface;
an inner surface;
a guiding groove formed on the inner surface of the covering side plate, extending to the top surface of the covering side plate, and having a bottom; and
a bottom wall formed on the bottom surface of the covering side plate and located at the bottom of the guiding groove; and wherein two sides of the body of the frame are moveably inserted into the guiding grooves of the two covering side plates, and the top stop portion is located above the top surfaces of the two covering side plates.

31. The webbing height adjustment device as claimed in claim 21, wherein the first plate portion of the slider and the second plate portion of the slider vertically deviate from each other, the first plate portion has a top surface, a bottom section, and a bottom end, the second plate portion has a top surface, a top section, and a top end, and the top surface of the first plate portion is higher than the top surface of the second plate portion;

the through portion of the slider is formed between the bottom section of the first plate portion and the top section of the second plate portion, and has two side walls disposed at two sides of the through slot, each one of the two side walls connected to the first plate portion and the second plate portion and having an outer surface; and two slide slots respectively formed on the outer surfaces of the two side walls, each one of the two slide slots located between the first plate portion and the second plate portion, wherein two longitudinal side portions of the body are respectively inserted into the two slide slots;

the through slot is sloped from the top end of the second plate portion toward the bottom end of the first plate portion and is located between the two side walls;

the cover has a top stop portion formed on the back surface of the covering base; and each one of the two covering side plates having a top surface;
a bottom surface;
an inner surface;
a guiding groove formed on the inner surface of the covering side plate, extending to the top surface of the covering side plate, and having a bottom; and
a bottom wall formed on the bottom surface of the covering side plate and located at the bottom of the guiding groove; and wherein two sides of the body of the frame are moveably inserted into the guiding grooves of the two covering side plates, and the top stop portion is located above the top surfaces of the two covering side plates.

32. The webbing height adjustment device as claimed in claim 27, wherein the connecting portion of the frame is connected to a connecting strap, the connecting strap is connected to a connecting element, and the webbing passes through the connecting element.

33. The webbing height adjustment device as claimed in claim 28, wherein the connecting portion of the frame is connected to a connecting strap, the connecting strap is connected to a connecting element, and the webbing passes through the connecting element.

34. The webbing height adjustment device as claimed in claim 29, wherein the connecting portion of the frame is connected to a connecting strap, the connecting strap is connected to a connecting element, and the webbing passes through the connecting element.

35. The webbing height adjustment device as claimed in claim 30, wherein the connecting portion of the frame is connected to a connecting strap, the connecting strap is connected to a connecting element, and the webbing passes through the connecting element.

36. The webbing height adjustment device as claimed in claim 31, wherein the connecting portion of the frame is connected to a connecting strap, the connecting strap is connected to a connecting element, and the webbing passes through the connecting element.

* * * * *